(12) United States Patent
Radulescu

(10) Patent No.: US 11,776,053 B2
(45) Date of Patent: Oct. 3, 2023

(54) SYNCHRONIZED EXCHANGE SYSTEM

(71) Applicant: Codrut Radu Radulescu, West Orange, NJ (US)

(72) Inventor: Codrut Radu Radulescu, West Orange, NJ (US)

(*) Notice: Subject to any disclaimer, the term of this patent is extended or adjusted under 35 U.S.C. 154(b) by 636 days.

(21) Appl. No.: 15/509,352

(22) PCT Filed: Sep. 8, 2015

(86) PCT No.: PCT/US2015/048883
§ 371 (c)(1),
(2) Date: Mar. 7, 2017

(87) PCT Pub. No.: WO2016/037178
PCT Pub. Date: Mar. 10, 2016

(65) Prior Publication Data
US 2017/0330278 A1    Nov. 16, 2017

Related U.S. Application Data

(60) Provisional application No. 62/046,980, filed on Sep. 7, 2014.

(51) Int. Cl.
*H04J 3/06* (2006.01)
*G06Q 40/04* (2012.01)
*H04L 43/106* (2022.01)
*H04L 67/1095* (2022.01)

(52) U.S. Cl.
CPC ............ *G06Q 40/04* (2013.01); *H04J 3/0641* (2013.01); *H04J 3/0667* (2013.01); *H04J 3/0685* (2013.01); *H04L 43/106* (2013.01); *H04L 67/1095* (2013.01)

(58) Field of Classification Search
None
See application file for complete search history.

(56) References Cited

U.S. PATENT DOCUMENTS

| | | | |
|---|---|---|---|
| 5,566,180 A * | 10/1996 | Eidson | G06F 1/14 370/473 |
| 5,684,760 A | 11/1997 | Hunter | |
| 6,157,957 A | 12/2000 | Berthaud | |
| 6,509,870 B1 | 1/2003 | Matsushita et al. | |
| 6,829,244 B1 * | 12/2004 | Wildfeuer | H04J 3/0632 370/412 |
| 8,285,792 B2 | 10/2012 | Itoh | |
| 9,577,898 B1 * | 2/2017 | Baldi | H04L 43/062 |
| 2002/0101577 A1 | 8/2002 | Thwing et al. | |
| 2002/0141523 A1 * | 10/2002 | Litwin, Jr. | H04B 3/542 375/356 |
| 2003/0152034 A1 * | 8/2003 | Zhang | H04L 29/12509 370/252 |
| 2004/0145423 A1 | 7/2004 | Kirsh | |

(Continued)

FOREIGN PATENT DOCUMENTS

EA    0567269 A2    10/1993

*Primary Examiner* — Kenny S Lin

(57) ABSTRACT

A method for synchronous processing exchange orders, comprising: creating a first batch of orders by accumulating exchange orders received within a first time period, TP1; creating a second batch of orders by accumulating exchange orders received within a second time period, TP2; and processing the orders from the first batch within the second time period, TP2.

20 Claims, 6 Drawing Sheets

(56) References Cited

U.S. PATENT DOCUMENTS

| | | | |
|---|---|---|---|
| 2004/0258099 A1* | 12/2004 | Scott | H04J 3/0632 370/503 |
| 2006/0109866 A1 | 5/2006 | Janssen et al. | |
| 2009/0172058 A1* | 7/2009 | Cormode | G06F 17/18 708/274 |
| 2012/0023262 A1* | 1/2012 | Berke | G06F 1/12 709/248 |
| 2012/0219099 A1* | 8/2012 | Loukianov | H04J 3/0697 375/357 |
| 2013/0034197 A1* | 2/2013 | Aweya | H04J 3/0664 375/362 |
| 2014/0173136 A1* | 6/2014 | Hazelet | G06F 1/14 709/248 |
| 2015/0281028 A1* | 10/2015 | Akhter | H04L 43/106 370/252 |

* cited by examiner

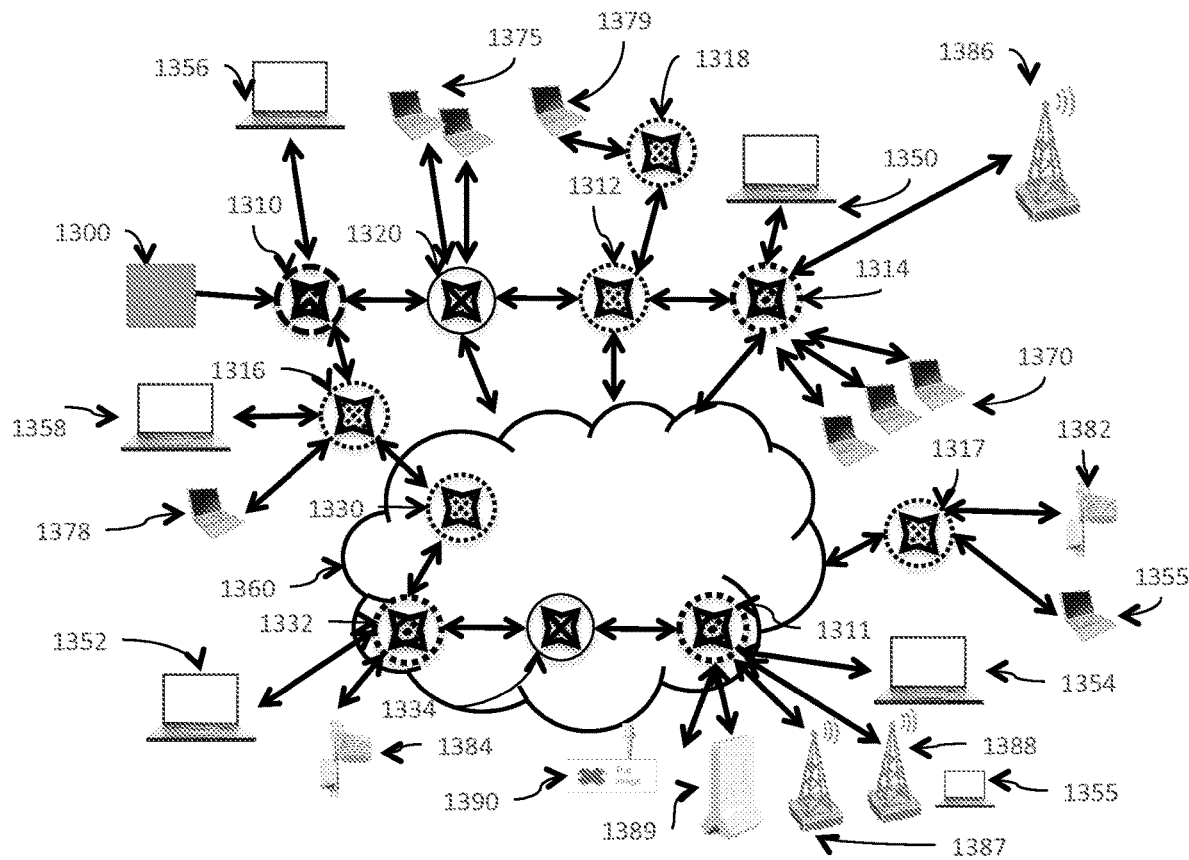
Fig 13
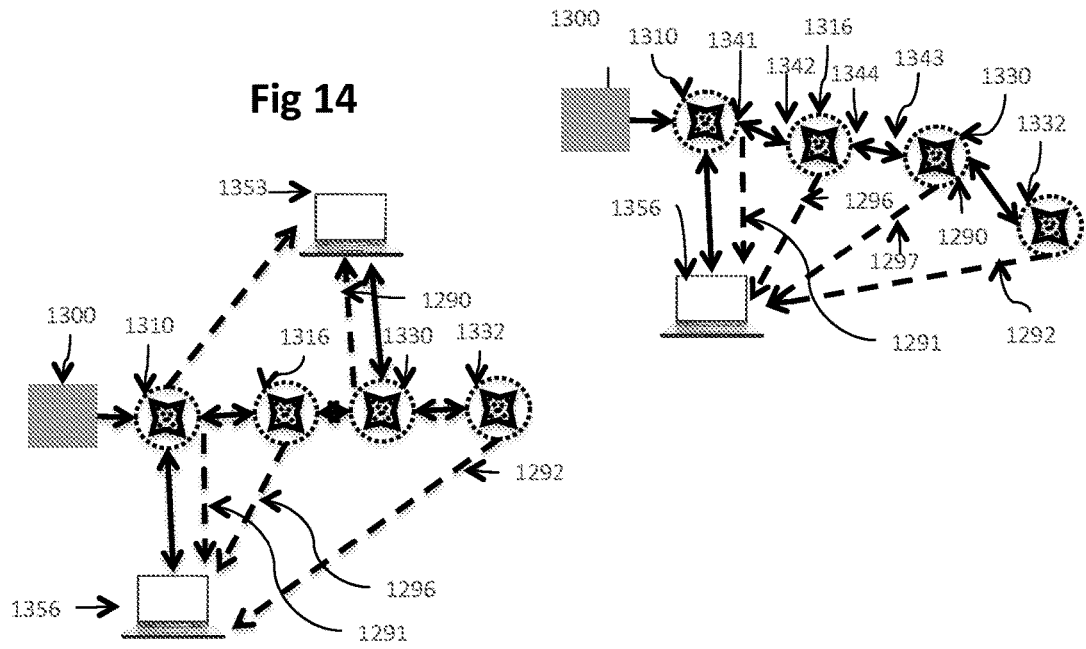
Fig 14
Fig 15

SYNCHRONIZED EXCHANGE SYSTEM

This application claims the benefit of provisional application No. 62/046,980, filed Sep. 7, 2014, the disclosure of which is incorporated in its entirety by reference thereto.

FIELD OF THE INVENTION

This invention generally relates to data networks and more specifically relates to timestamped event synchronization.

BACKGROUND OF THE INVENTION

U.S. Pat. No. 6,438,702 discloses U.S. Pat. No. 6,313,834.

US 20020101577 A1—discloses the use of a mirror to measure the propagation delay on a fiber for the purpose of measuring the fiber length.

U.S. Pat. No. 8,285,792 B2 describes a synchronous distribution method.

U.S. Pat. No. 8,416,812 B2 describes a network synchronization system.

DE69529555D1, EP0717329A3, U.S. Pat. No. 5,684,760 describes a circuit arrangement for measuring a time interval US 2014/0139272 describes a Fractional frequency divider with phase permutation, U.S. Pat. No. 5,394,116 describes a Fractional phase shift ring oscillator arrangement U.S. Pat. No. 7,088,032 B2 provides a spiral winding to enhance heat transfer to an oscillator CN1695305 (A) describes a sequence control signal generator using a TRO

SUMMARY OF THE INVENTION

One object of this invention is to provide a new technical solution for synchronous processing of exchange orders.

BRIEF DESCRIPTION OF DRAWINGS

The invention will be more fully understood and further advantages will become apparent when reference is had to the following detailed description of the preferred embodiments and the accompanying drawings, in which:

FIG. 13 shows an example of General Timing Synchronization topology and data flow.

FIG. 14 shows another example of Generalized Timing Synchronization topology

FIG. 15 shows an example of Generalized Timing Synchronization topology

DETAILED DESCRIPTION OF PREFERRED EMBODIMENTS

Figure 1:
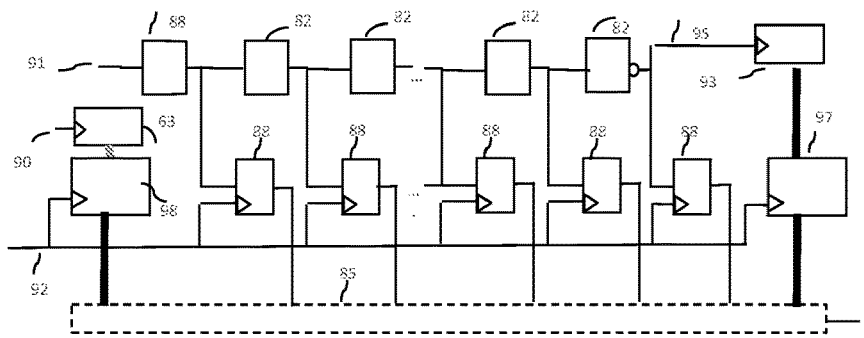
FIG. 1 shows an example of a fractional timestamping and frequency counter

Various exemplary embodiments of the present invention will now be described in detail with reference to the drawings. It should be noted that the relative arrangement of the components and steps, the numerical expressions, and numerical values set forth in these embodiments do not limit the scope of the present invention unless it is specifically stated otherwise. The following description of at least one exemplary embodiment is merely illustrative in nature and is in no way intended to limit the invention, its application, or uses. Techniques, methods and apparatus as known by one of ordinary skill in the relevant art may not be discussed in detail but are intended to be part of the specification where appropriate. In all of the examples illustrated and discussed herein, any specific values should be interpreted to be illustrative only and non-limiting. Thus, other examples of the exemplary embodiments could have different values. Notice that similar reference numerals and letters refer to similar items in the following figures, and thus once an item is defined in one figure, it is possible that it need not be further discussed for following figures.

Synchronous piped exchanges need accurate synchronization, a protocol for communication and associated applications, a high stability independent array of oscillators for time stability during synchronization cycles, fractional timestamping, and an environment condition control subsystem.

The purpose of GTS is to ubiquitously provide high accuracy timing for all things connected to Internet with minimal costs. GTS synchronizes the nodes of a data network non-intrusively by timestamping regular traffic and transferring timestamps through metadata packets. Timestamps and associated packet identifiers of regular data traffic are accumulated in metadata packets and sent to a processors that generates correction factors, CFs for timing synchronization. The metadata packets can be encrypted as any other packets, and sent for processing to any proxy processor node in the cloud. This eliminates the need of a CPU and a license for simple, or sensor and actuators nodes. An embodiment has the proxy processor collocated with a port taking timestamps, and the timestamps and packet identifiers are passed directly to the processors or are passed through metadata packets internally conveyed to the processor. Applications that do not need to physically generate an accurate signal or pulse do not need to adjust the frequency of a local oscillator. Local timestamps can be rescaled by the CF resulting in "synchronized timestamps" relative to a reference node timing. When necessary to improve clarity we use time domain to differentiate timing. In general a time domain will apply to timestamps take at all the ports of a node. Nevertheless it does not restrict ports of a node having their own distinct time domain. An embodiment uses a hardware fractional counter to perform fractional timestamping and improve the precision and speed of synchronization.

GTS resynchronizes instantly after power up as soon as packets are received from a synchronized switch, and needs not timing holdover. GTS quality of synchronization is quasi independent of the traffic load. Low traffic loads have low PDV that generates highly accurate of synchronization. Heavily loaded networks generate significantly more timestamps that provide accurate synchronization. Software timestamping adds stationary PDV to timestamps. The high number of timestamps makes possible software timestamping for legacy systems, when the latency of timestamping is quasi stationary. In addition synchronization cycle period is much smaller because a sufficient number of timestamps can be accumulated even within a short time, typically fractions of a second. Regular XO crystal oscillators could be quay stable during a short cycle because of the limited gradient of the frequency drift during the short period synchronization cycles. For instance if the frequency is locked within 20 ppB the phase error accumulated within a 4S cycle will be 80 nS, significantly below the microsecond accuracy required in most of the applications. Another 0.5 ppB frequency error will accumulate a 0.25 nS phase error for a 0.5S synchronization cycle.

A regional, or central synchronization proxy topology has access to the timestamps from several interconnected nodes. The comprehensive access to the timing of each node and the level of links PDV, the proxy processors can easily determine the best synchronization flow through paths and nodes. (see FIG. 19, 20, 21, 15, 14). It can also determine the synchronization behavior for each node in comparison with other nodes and select the most stable timing references according to the invariable measurement selection method. Reference nodes can be dynamically selected according to the self assessed confidence factors, SACF methodology known to the skilled in the art and the inherent use of multiple reference nodes by the GTS synchronization algorithms.

GTS can trace all data packets and synchronization status throughout the network while ensuring privacy and intrusion protection thru encryption and encoded packet identifiers. The timestamps generated by a data packet have an associated path identifier and individual data packet identifier. Timestamps taken at intermediate, daisy chained nodes are distinguished through the intermediate nodes addresses. Accurate propagation delay on a path can be determined through timestamps collected from the many packets traveling between the end points, including alternative paths and elimination of the resident time by using timestamps collected at intermediate node. An embodiment described in FIG. 15 takes timestamps from ports 1341, 1342, 1343, 1344. Ports 1342, and 1343 belong to the same switch node, 1316. Each port determines a packet identifier for time-stamped packets and transmits timestamps and packet identifiers, through metadata packets to the proxy processor (1356) using the logic paths 1291,1296, and 1297. The actual physical paths are all going to node 1310 that is directly connected to 1356. The processors identifies timestamps generated by the same packet and subtracts from the end to end delay (1344 timestamp minus 1341 timestamp) the difference between the departure timestamp at 1343 and the arrival timestamp at 1342, for the packet.

An embodiment synchronizes all nodes in a path efficiently by using a proxy process for several or all nodes that minimizes number of metadata packets. The proxy processors can be physically located at any end point of a synchronized path, at the reference, at the follower or at an intermediate node, at the carrier management nodes or anywhere in the Cloud. Proxy processor function is to execute the synchronization algorithms, producing correction factors or retiming timestamps and using timestamps received as metadata packets from the nodes that must be synchronized relative to each other. Also a proxy processor manages and organizes the proper distribution of resources. An embodiment has the proxy processor following network operator polices. Metadata packets, MDPs are generated at regular time intervals or when a new set of timestamps was accumulated. MDPs are regular data packets traveling through the network to the proxy processor and are timestamped by the nodes in the path like any other packet. Also GTS can encrypt MDPs to prevent intrusion and other attacks.

In one embodiment the follower node is synchronized by one or several proxy processes. A regional, centralized synchronization architecture is better tailored to a mesh network topology that provides an abundance of alternative paths for synchronization. Timing is tightly integrated with the carrier network management and routing and should seamlessly integrate with existing OAM architecture. Timing synchronization is naturally and synergistically part of the routing and network management. Integrated management of timing synchronization and network routing is a more efficient and powerful deployment of Internet services. GTS uses existing IP and carrier structures without a need to open new type of ports and messaging services. Users have the option to run their own proxy processors in parallel with the operators' proxies, providing parallel and independent reference timing through the network to other users involved in private or virtual timing networks.

An actual, physical correction of a frequency is a recursive process of calculating and applying a CF to the last corrected frequency. The accumulated correction factors, ACF is equivalent with the correction of that free running oscillator under current environment conditions. An embodiment has a proxy process running on programmable hardware or a computer (FIG. 15, 1536) associated with a pair of nodes (FIG. 15, 1310, 1332) that receives the timestamps from network nodes and computes the correction factor (CF) for a follower (1332) relative to a reference (1310 or 1316, 1330). For synchronized switches (or nodes) that are directly connected (FIG. 13, 1310, 1320) all packets will travel in between the reference and follower because there is not tributary traffic in between. If there are intermediate switches (FIG. 13, 1312) present in between the reference (1310) and follower (1314) tributary packets are added or removed (to 1318) and would reach only one of the reference or follower switches. The routing protocols and tables would indicate the packets routed through the end nodes and only the timestamps associated with those packets would be sent to the proxy CPU for efficient processing. Also the metadata contains routing information sufficient to identify only the packets on the synchronized nodes' path. The packet timestamps collected for several or all nodes of a path or network will provide additional useful information to synchronize several or all the nodes of the network, eliminate PDV and chose the best reference nodes. For example the packets on the path between 1310 and 1314 (FIG. 13) are also timestamped at 1312 potentially both at the inbound and outbound ports. All timestamps associated with packet identifiers are sent to the proxy 1356 running the synchronization algorithms. A timing reference node can be a node (FIG. 13, the reference, atomic clock 1300), switch or router (1310). Some ports of a node could be timing followers, some other ports could be timing references. According to conditions this status could change to achieve general nodes synchronization. Each switch could have a proxy processor CPU that could be its own CPU or a proxy processor located on the LAN or Cloud, that performs the synchronization algorithms and produces the timing correction factors or does the synchronized timestamps by scaling actual timestamps.

Timestamps are accumulated in a metadata packet, MDP and sent to a proxy processor that pairs timestamps generated by the same packet event, and runs a synchronization algorithms. A timestamp is identified by the address of the source and destination port, TCP IP sequence, or checksum, or length, or sequence number or other payload identifications of the packet. An embodiment provides packet identifiers every N timestamps or only for the first timestamp in a metadata packet. The intermediate node port address is provided to distinguish its timestamps. Another embodiment transmits only timestamps difference to reduce amount of redundant data. In another embodiment the metadata packet comprises a routing sub header comprising source and destination interface addresses, direction relative to reference node and eventually the intermediate interface address where the timestamp was collected, either complete or in compressed form. Another embodiment comprises a timing sub header comprising the local clock period in time units or in clock periods. Yet another embodiment comprises a frequency and a phase correction factors actually applied to the local oscillator when timestamp were taken. The timestamp could be represented in either number of clocks or units of time. A node would identify from the routing header if the source and destination are a reference follower pair and if there is a request to forward the metadata to a proxy. An embodiment will transmit timestamps accumulated over a cycle only if they are over a certain number threshold. If timing of a node changes a new timing sub header will be generated that will include the new CFF or CFP associated with the subsequent timestamps.

GTS is order of magnitudes more efficient than traditional protocols. It takes less than the SORT of number of packets used by IEEE 1588 to transfer the same or much higher number of timestamps. Considering for example a 100 follower switches collecting 100 timestamp pairs per second. A traditional IEEE 1588 implementation will generate 4×100×100=40,000 packets. GTS would use only 100 metadata packets if the proxy CPUs are located at either end of a link or 200 packets if the proxies are located elsewhere. In addition, while IEEE 1588 produces 200 timestamp pairs per link, the number of timestamps available to GTS could be thousands of times higher and limited only by the bandwidth of the link. If any of the 100 links carry in average 1 Mega packets/S per direction then 4×100×1 Mp/S=400,000,000 timestamps could be produced by GTS, four orders of magnitude more than the 40,000 timestamps generated by IEEE 1588. IEEE 1588 is in fact a degenerated version of GTS when proxy is located on the follower node and meta data contains only one timestamp.

The high speed synchronization algorithms correct the frequency drift of low cost oscillators before it crosses the maximum drift error. Example if a CF cycle takes 4 Seconds and the maximum speed for temperature increase is 1° C./20S (0.05° C./S) and the characteristic of the oscillator is 200 ppB/° C. then in 4 S the temperature will change by 0.200/° C. frequency will change by 200*0.2=40 ppB. Such a performance is achievable for regular quartz oscillators.

A Correction Factor (CF) comprises a frequency correction factor, CFF that is the reference frequency divided by the follower frequency, and a phase correction factor, CFP that is the reference phase minus the follower phase. The follower timing is actually corrected every cycle by a new CFF or CFP. Current correction of the local timing relative to its default status is the accumulated correction factor, ACF the integration of all CFs from correction cycles. The numerical equivalent of the accumulated CFF and CFP corrections are respectively ACFF and ACFP and can be included in the metadata packet. If the follower does not correct local timing, the ACFF and ACFP (collectively ACF) can be used to calculate synchronized timestamps by scaling the raw timestamps received from the node and used for calculation of CF.

An embodiment starts the network timing synchronization from a primary reference node and propagates node by node. Such daisy chained nodes that do not change local timing (for instance legacy switches) can be virtually synchronized and timestamp can be retimed by re-scaling. A chain of virtually synchronized nodes (FIG. 13, 1300, 1310, 1316, 1330, 1332) will have to integrate all the hop by hop, relative ACF of upstream chained nodes (1310, 1316, 1330) to obtain a correction of a follower node (FIG. 13, 1332) timing relative to the primary node timing (FIG. 13, 1300), and can use a centralized proxy synchronization (FIG. 13, 1356 or 1352) for increased efficiency, speed and accuracy of the process. In a daisy chain topology a downstream node "n+1" is virtually synchronized to node "n" by ACF(n+1,n). The node "n" is also virtually synchronized to a previous reference node "n−1" by ACF(n,n−1). The timestamps generated by node "n" (on both the interface to node n−1 and the interface to node n+1) are relative to its local free running timing. To synchronize the node n+1 to the node "n−1" the virtual correction factor calculated to synchronize the downstream follower node "n+1", ACF(n+1,n) relative to node "n" should be corrected by ACF(n,n−1) calculated to synchronize the node "n" to the reference node "n−1". The corrections will propagate through the daisy chain, node by node, based on a recurrence relation, ACF(n+1, n−1)=ACF(n+1,n)*ACF(n,n−1). Through mathematical induction it results ACF(n+1,1)=ACF(n+1,n)* . . . *ACF(2,1) that is the correction for the node n+1 relative to a reference node 1. FIG. 14 shows the topology of proxy 1356 receiving from node 1310 metadata packets from 1310, 1316, 1332 (logic paths 1291, 1296, 1292), pairing timestamps from different nodes that have the same packet identification and determining CF and ACF to synchronize 1316, 1332 to 1310. The system can compute ACF (0,2) synchronizing 1332 directly to 1310, or can compute ACF(6,2) relatively synchronizing 1332 to 1316. Also the system can send metadata packets from 1330 to 1356 to eliminate the PDV occurring at 1330 in impacting synchronization of 1332. The other proxy 1353 receives metadata packets from 1310 and 1330, pairs them and computes the synchronization ACF for 1330. 1353 could also receive metadata packets from 1316 and subtract the resident time on 1316 to reduce PDV and perform a better synchronization of the 1330.

Numerically synchronized timestamps eliminate the error resulting from delays in hardware response when updating correction factors. An embodiment performs an actual correction of the local timing, and in parallel the virtual synchronization and timestamps retiming. The local timestamps used to calculate a CF can be rescaled by changed the timestamp difference proportionally with CF.

Without reducing from generality FIG. 13 is an example of a preferred embodiment of General Timing Synchronization (GTS) topology and data flow. The doted shape switches indicate switches with timestamping capability. Among those there are switches designated as reference by network operator management. For example router node 1310 is the primary reference. Secondary timing reference level comprises nodes 1311, 1314, 1332. Third reference level comprises nodes 1312, 1316, 1330. Solid line switch symbols represent switches without any time stamping capabilities (1320). A proxy is represented by a computer with a white screen. A preferred embodiment allocates a proxy to one synchronization path. For example proxy 1352 is allocated to the path 1310, 1316, 1330, 1332, 1334 (see FIG. 13). Synchronized computers are generally ending leafs of the network (black screen computers in FIG. 13). The switch 1310 is synchronized to an atomic etalon, 1300 and it is considered primary timing. A regional proxy synchronizes several switches of a region. As an example the 1358 computer could be a regional proxy that permanently calculates correction factor to maintain the 1316, 1312, 1318 switches from the adjacent region synchronized to 1310. In an embodiment the 1358 node receives metadata packets containing timestamps of user traffic between 1310 and each of 1316, 1312, 1318. For instance a packets that travels between 1316, 1310, 1312, 1318 (FIG. 13) would generate timestamps on each. Those timestamps would be transmitted to 1358 and paired by using the packet identifier to calculate the local timing correction factors for each node. More specifically user data communication between computer 1378 and 1379 (FIG. 13) that would cross switches 1316, 1310, 1312, 1318 will be timestamped by all the nodes in the path, that includes ending computer nodes. The proxy processor can use timestamps of identified packets collected on the ports of intermediate switches 1312, 1310 to eliminate the PDV. Also each node in the path is synchronized to several other nodes. For instance 1318 could synchronize to 1310, 1314, 1312 or any combination thereof.

The timestamps collected at different nodes paired with their packet identifier can be synchronized offline by adding the CFP and multiplying in timestamps intervals by CFF. To verify, the synchronization algorithm should produce a neutral correction factor from the synchronized timestamps. A more accurate CF would be obtained if we remove the PDV generated by resident time at the intermediate nodes from arrival timestamps. For example node 1332 can obtain metadata packets from nodes 1316 and 1330. The node 1332 can first remove the PDV for the timestamps collected at node 1332 by adding to its local timestamps the resident time of the identified packets at the at the intermediate nodes 1316 and 1330. Another embodiment would scale the timestamps hop by hop. The timestamps collected at node 1316 would be scaled by using a correction factor CF1 calculated from timestamp pairs associated with packets traveling between nodes 1310 and 1316. Similarly timestamps collected at node 1330 could be scaled from the already scaled packets for node 1316 by a correction factor CF2. Another embodiment uses raw timestamps generated at node 1316 and node 1330 to generate a correction factor CF12 that is relative to the local clock of node 1316. To obtain the correction factor relative to the reference node 1310, the node 1330 must integrate the correction factors of the intermediate node. It results that CF2=CF12*CF1. Then could scale with the factor CF2 the timestamps taken at node 1330. Yet another embodiment recursively scales the timestamps of each node until all the required timestamps are scaled as if the respective nodes were synchronized. Thus CF2 is calculated from the timestamps taken at node 1316 and scaled by CF1 and timestamps of node 1330. Then the timestamps of 1330 are scaled by CF2. This can calculate absolutely synchronous timestamps throughout the network without changing the local clock of the nodes. An embodiment sends all the timestamps from network nodes to a central proxy CPU that synchronizes the timestamp relative to a reference node of the network. This method provides a low cost event tracing and market reconstruction for financial transactions and any other audited networks GTS can produce accurate timing synchronization when using software timestamping because the high number of timestamps (~10E6), practically generated for all data packet exchanged with the follower, increase precision of the solution. An embodiment timestamps network data packets through interrupts or by polling the transmission and reception. Such software based timestamping can synchronize all IoT nodes.

Figure 10:
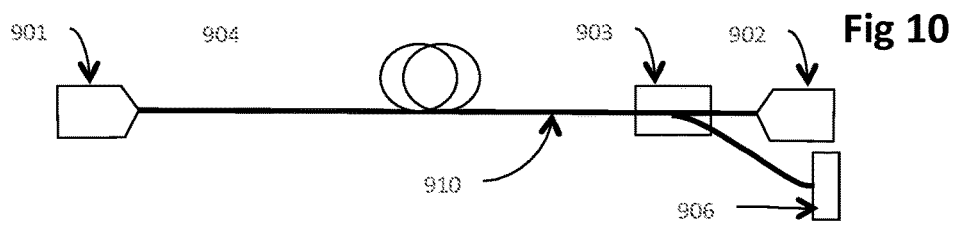
FIG. 10 shows an example of measurement of propagation delay of single fiber one frequency bidirectional channel by using a splitter, 903 and a reflector, 906
Figure 11:
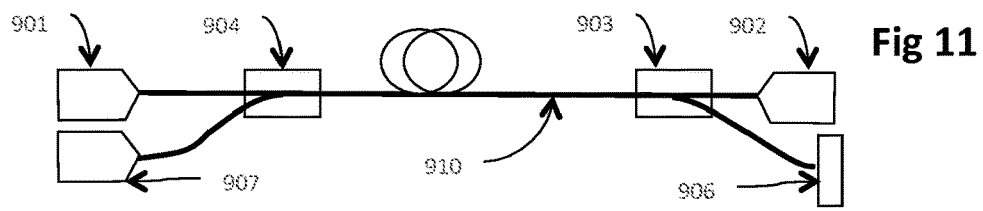
FIG. 11 shows an example of measurement of propagation delay of single fiber, two frequencies bidirectional channel by using a splitter, 903, a reflector, 906 and a second receiver, 907 tuned for the reflected frequency, same as transmitted frequency from 901.
Figure 12:
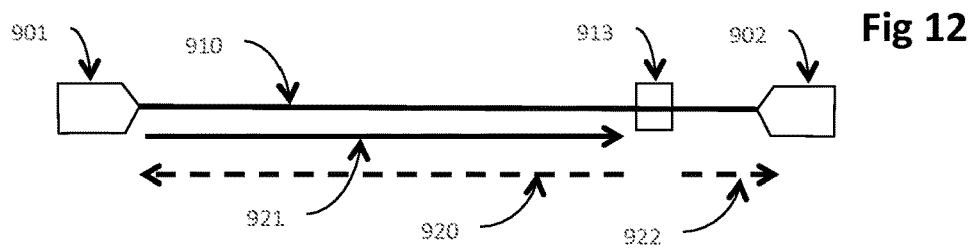
FIG. 12 shows an example of a discontinuity (913) in the communication channel that reflects back (920) part of the transmitted signal 921 while the remaining signal (922) is received by 902.
Figure 21:
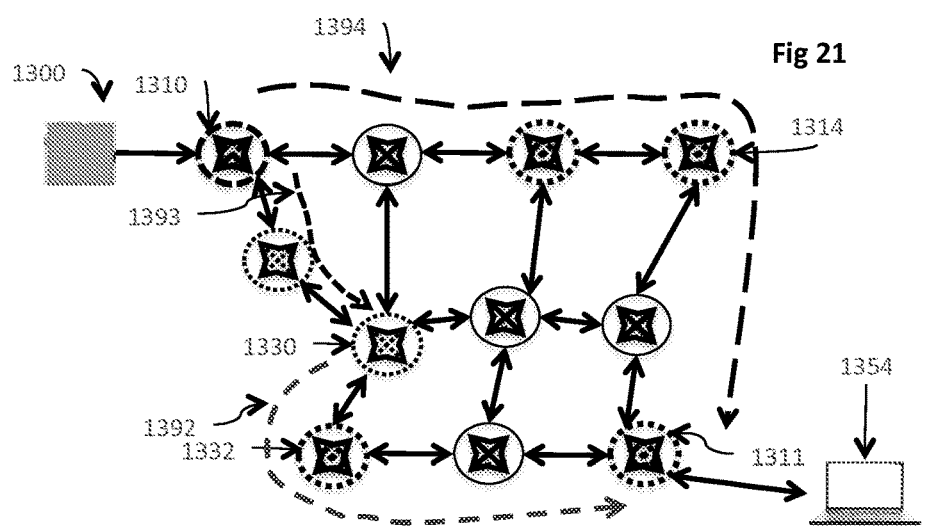
FIG. 21 shows an example of Generalized Timing Synchronization topology

Sub nS timing synchronization requires sub nS accuracy in measurement of propagation delay between synchronized nodes. Slightest variation of the path length, properties, or frequency of the signal creates asymmetries leading to synchronization errors. Our method achieves symmetry by calculating propagation delay from partial reflections of data signal transmitted from a first node (901) to a second node (902) on the same path. (FIG. 21, 11, 10). Reflection can be either accidental or intended. An embodiment that uses optical fiber for the communication channel uses a splitter (903) and a mirror (906) or a MEMS device at the second node (902) or could use an SFP or connectors exhibiting reflections. See FIGS. 10 and 11. Another embodiment and do an internal PHY (902, 901) loopback of the physical signal received, to the transmitting end that can measure the round trip propagation delay. Another embodiment can do a loopback after decoding the digital signal in the PHY by sending it directly to encoding transmit block and generating a new transmit signal, with the difference that the frequency may not be identical with the receive frequency. Embodiments avoid interference of the reflected data signal by multiplexing it in frequency or in time with the data signal transmitted by second node. An embodiment uses a single fiber transmissions channel and two different frequencies, one for data transmission from each node. Second node (902) continuously reflects part of the received signal that is frequency multiplexed with its transmitted signal. First node (901) receives both frequencies and separates each of them (901 and 907). Another embodiment uses an SFP unit at the first node (901) that transmits on 1550 nm and receives only 1310 nm signal from the second node. Another SFP (907) at the same first node receives only the 1550 nm signal reflected at the second node (902) and a CPU measures the round trip timing. (FIG. 11) Another embodiment uses single mode fiber and only one frequency at both ends (FIG. 10). The reflected data signal and the data transmitted signal at the second node are multiplexed in time. To avoid interference, for short periods of time the transmission from 902 is interrupted and the reflected (906) signal is received by 901 that can measure the round trip delay of the reflected signal and the propagation delay. The timing of 902 can be adjusted by the propagation delay of the reflected signal plus the departure timestamp at the first node, 901 for single frequency (or 907 for two frequencies) minus the arrival timestamp taken at 902.

The skilled in the art my implement time division multiplexing in many ways. The reflected signal is received as dominant signal when the opposite node transmission is interrupted. The mere lack of modulated transmit signal (902) can determine node 901 to receive its own data transmitted signal reflected from 906 or 913 (FIG. 10, 21), recognize its content, measure the round-trip delay and overall propagation delay. The skilled in the art knows that a reflected digital signal (from 907, 913) below a noise threshold relative to a dominant signal (902) is ignored therefore a reflected signal below a certain threshold will not disturb the data signal transmitted by 902.

Timing synchronization correction results from two methods or equations expressing propagation delay between nodes 901 and 902. First it is an accurate, symmetrical propagation delay through reflected data signal. Second propagation delay is calculated from departure and arrival timestamps of a data packet. One of the departure or destination time is adjusted to have both propagation delays equal. An embodiment that performs sub nS timing synchronization produces sub nS Timestamping accuracy at both nodes by using fractional counters for timestamping or by averaging many less accurate timestamps that result in increased accuracy.

An embodiment of this invention comprises an exchange system performing any type of transaction involving transfer of valuables. The exchange system receives as input orders to buy or sell. The system updates the status or outcome of the order at discrete time intervals. An embodiment could be used in any market transactions including financial and stock transactions. The market participants (MP) are connected through a network running a Generalized Timing Synchronization protocol (GTS) that timestamps every order or financial message and synchronizes the timestamps to a primary timing node. Exchanges operate in batch mode and are time synchronized from a primary source. Orders are accumulated and processed into small, groups called batches. Market updates happen only at synchronous, discrete intervals. Matching orders from several exchanges could be consolidated at one designated home match location. The orders are executed in discrete steps of defined time duration. Such process allows deterministic outcome using complete data from all exchanges, by ensuring completion of communications between exchanges and process functional completion during the time interval associated with a step. One matching location allows faster and deterministic processing and complete traceability of regulatory compliance. Synchronized Batch Processing (SBP) removes racing conditions and instant crashes caused by inherent instability of continuous trading systems. The synchronous discrete nature of batch transactions allows distribution of tasks and fair dissemination of reliable information to every user. Our invention functionally models exchanges and market participants as an integrated feedback loop system. Exchange system stability is determined by the specific response characteristics in time. One embodiment uses discrete, clocked steps creating a deterministic and ordered transfer of data between the stages of the exchange process. Discrete steps gated by a clock provide deterministic timing and outcome for each stage of processing. The clock period is higher than a maximum latency of network communications during a stage. Sequences of network communications can be separated in several stages to reduce the clock period. Such clocked gated processing can eliminate the inherent problem of instability associated with continuous and variable delay response loopback systems, that is the typical, current implementation of an exchange. One important source of instability is the market participants response to exchanges' output, creating feedback loops that can induce high range fluctuations in the exchange parameters. An exchange system is taking transaction orders as input data and is providing new prices and ownership transfer as output data. Market participants provide a feedback loop into the exchange, generating transaction orders, as input data to the exchange is a combination of the output data and other external factors driving exchange actions. The stability of such feedback system depends on the relation between the speed of the direct and the speed of feedback data flow. If the delay of an external feedback loop is comparable with the internal processing speed of the system then stability becomes precarious. The tremendous increase in the speed of response of market participants (computing systems) that try to benefit from changes in market status create unavoidable instability of analog market exchanges leading to instant crashing syndrome. Generating orders with the same speed orders are processed by continuous operation exchanges, inescapably lead to systemic oscillations.

A trade could be modeled as a dead response time control loop because there is a dead period of time between placing an order and the outcome. More the outcome is not deterministic and quite unpredictable as orders degree of completion is not controllable. Such systems with a dead time longer than feedback loop response time are difficult to control and stabilize. Our method is stabilizing the exchanges by operating in discrete, synchronized clocked steps, batch accumulation of orders, consolidated matching for all pending orders from all locations at any point in time, or fair partial completion strategy of all pending orders. The period of the clock is an accurate control for the timing of the exchange that eliminates parasitic oscillations induced by fast trading algorithms.

Another embodiment of the invention creates a completely separate synchronized, exchange audit network, while maintaining undisturbed the current data flow and operations of exchanges by using the GTS protocol and algorithms. It taps into data at the ports of participant nodes. The data is timestamped and sent to a CPU for processing. The timestamps of data events between nodes are used to synchronize the nodes by calculating timing correction factors for the timing of each monitored node. Timestamps are corrected by the calculated correction factor to reflect the same synchronized timing across all the nodes. Synchronous timestamps allow causal temporal relations in determining compliance or attacks on the exchange system. The timing and audit is non intrusive and does not interfere with current operations of exchanges.

A preferred embodiment accumulates orders during a defined discrete time interval, in a batch of orders that will be processed in one cycle. Then the system closes order accumulation for the batch and sends it to processing at defined moments in time. At the same time a new batch starts accumulating next incoming orders. The accumulation of orders into batches is back to back to back process. At any time there will be an open batch receiving orders. During the batch processing there is no addition of new orders to the batch. Another embodiment seals the status of order completion during processing. These prevent front running and flash crashes. An embodiment processes a batch of orders in the sequence of their synchronized timestamps while another embodiment performs matches according to volume or policy priorities. Each type of exchange follows its algorithms and processes for order completion involving specific data communications with other nodes or exchanges.

Figure 16:
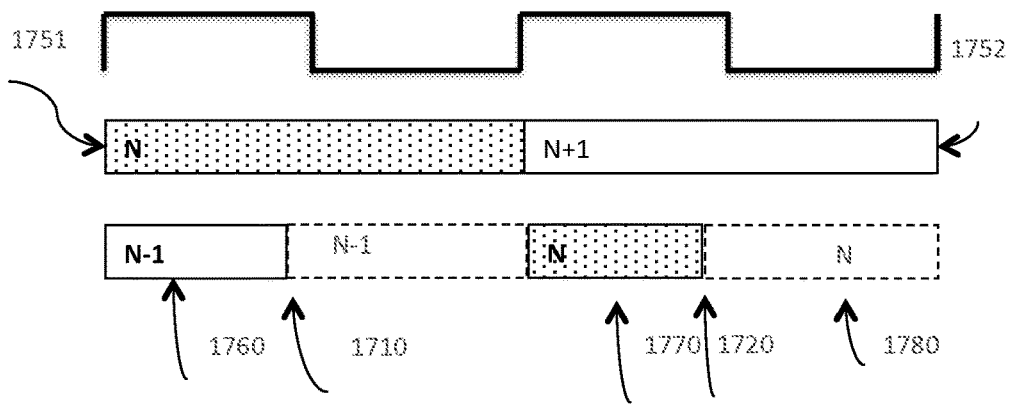
FIG. 16 shows an example of one embodiment of a WYSIWYG synchronous batch exchange timing.
Figure 17:
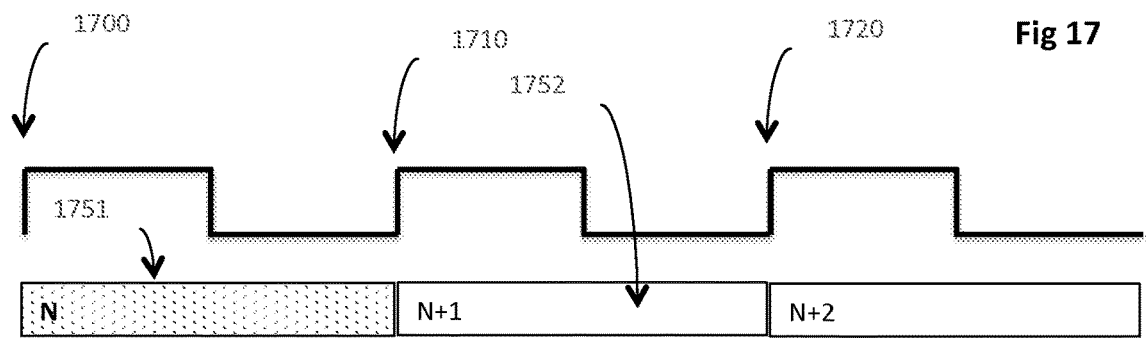
FIG. 17 shows an example of one embodiment of a two stage piped SBE.
Figure 18:
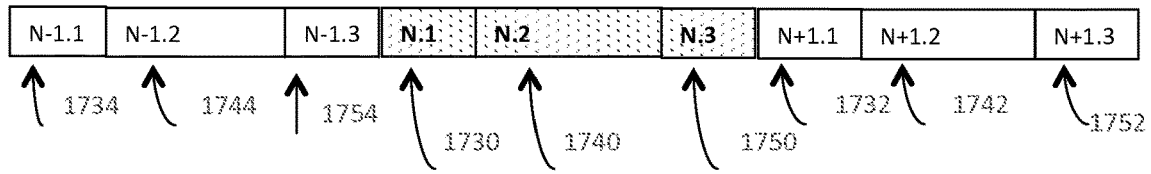
FIG. 18 shows an example of one embodiment of a synchronous, four stage piped synchronous batch exchange.
Figure 18:
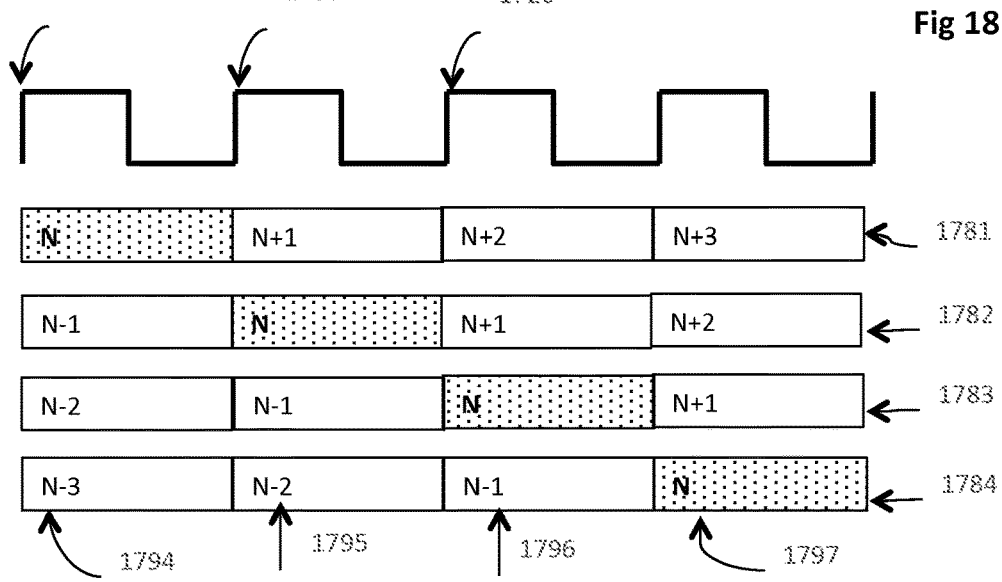
Figure 19:
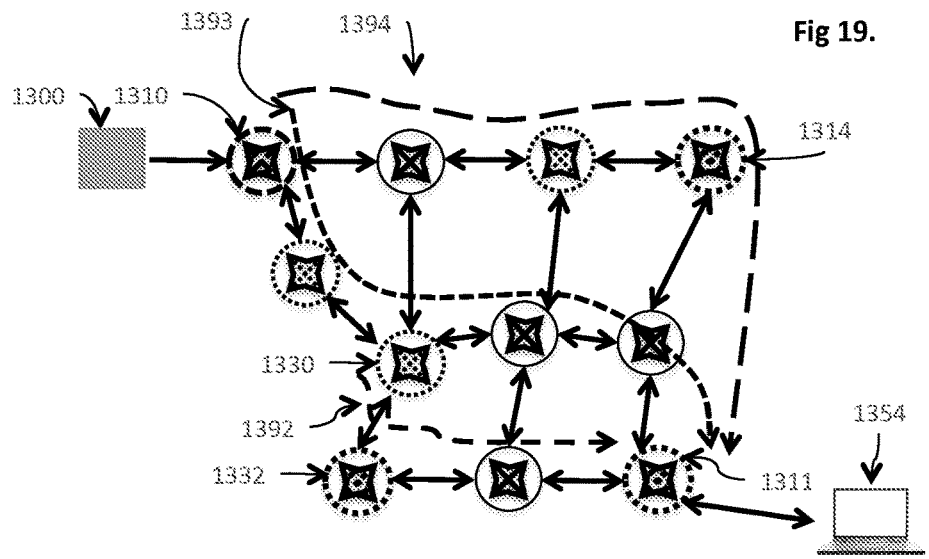
FIG. 19 shows an example of Generalized Timing Synchronization topology
Figure 20:
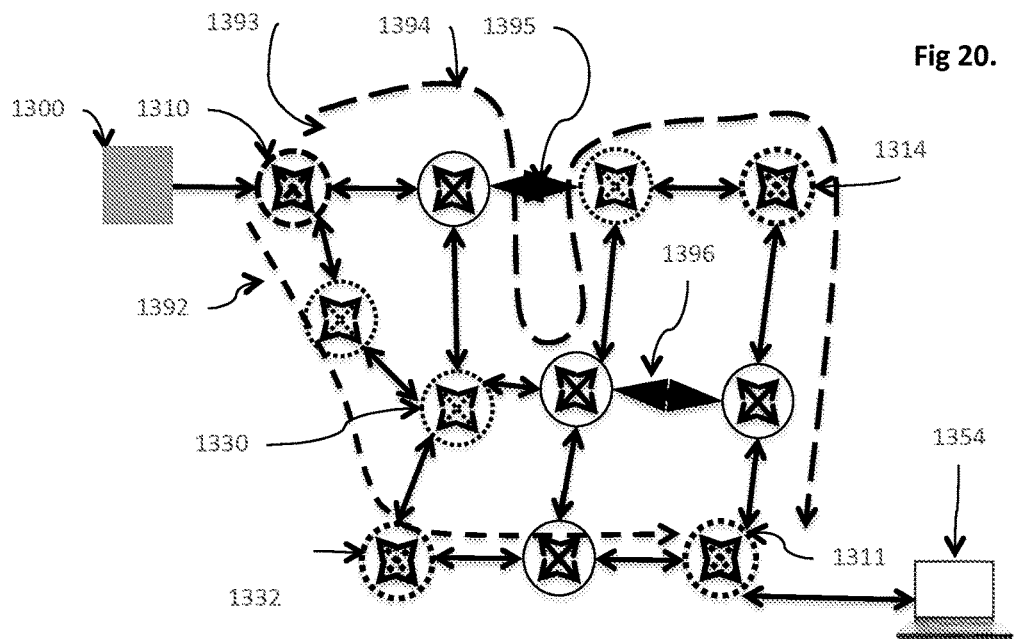
FIG. 20 shows an example of Generalized Timing Synchronization topology

A synchronous batch exchange, SBE is passing a batch of orders synchronously through a processing pipe, one stage at a time, at a synchronized clocked pace. A two steps, piped SBE embodiment is comprising an accumulating stage (FIG. 17 1751, 1752; FIG. 16 1770) for all orders received at any exchanges followed by batch processing stage (FIG. 16, 1780). Processing stage has multiple sub-steps (herein represented as N.1, N.2, N.3 for the order batch N). An embodiment of a piped SBE is indicated in FIG. 18. Each line, 1781, 1782, 1782, 1784 represents a functional step unit that performs a certain step of the exchange process. The processing comprises multiple steps. Without reducing from generality we count only four steps out of the complex number of steps required by a stock exchange process, comprising order accumulation, matching, clearing, executing, or distributing, see FIG. 18, 17, 16. In FIG. 18 we distinguish four batches of orders being processed at the same time, one in the each step unit, and transitioning between step units on the active edge of a clock (1700, 1710, 1720). For example batch N enters processing step 1781 on clock 1700, then moves to the next step 1782 on clock 1710 (FIG. 18)

All exchanges are synchronized in time with a precision necessary to avoid event aliasing known to the skilled in the art. Batches step through execution stages at the same time on all exchanges. In a preferred embodiment the actual matching for any individual exchangeable type will take place at one exchange, a declared home location exchange, eliminating multiple mesh communications between exchanges and replacing them with a star communication architecture having the home exchange in the center. This also eliminates the front running to other exchanges. Exchanges forward orders to the home exchange assigned to each exchangeable type allowing complete visibility of all orders placed within the current batch time. Clearing step is performed a part of one or multiple processing steps. Results of the final match are sent back to individual exchanges or nodes of the exchange network. Market price is updated for the market participants in another step. Policies of execution can be implemented and modified function of the market status, or can be preprogrammed by the time of the day or day of the week, etc. The length of the clock period can be changed to control the market dynamics. In contrast executing orders continuously, one by one and allowing intervention of high speed trading computers continuously at any time is changing trading context to the disadvantage of slow or remote market participants. Instant prices for each transaction depend on the previous orders processing sequence according to the winner of the speed race. Exchange operation in continuous mode is outcome determinative according to the sequence of events and subject to intervening high speed trading agents. Every new transaction changes the price seen by a subsequent transactions especially when new orders can be added or cancelled. SBE could maintain time priority through accurate order timestamping even for big volume orders until full completion eventually across multiple cycles. The SBE matching algorithm may alternatively try a set of possible matching solutions for all the orders in the batch that is aligned with a predefined criteria or policy as for example: volume, price, or percentage of completion. Another benefit of the batch mode is that high frequency purchase/sale cycles cancel each other within the batch. The front running and speed of reaction lose meaning within the period of the cycle as all orders in the batch are locked and isolated from the market access during processing. More SBE centralized matching eliminates front running because all orders from all exchanges are available to the matching engine. In addition centralized matching designates a location for each exchangeable type that allows distributed among all exchanges. An exchange failure would affect only the exchangeable types or stocks associated with that location.

The last step of a processing cycle is the transmission of completion data to the investors, SIP and other exchanges. All the exchanges will have to be synchronized with high precision using the Generalized Timing Synchronization™ or similar protocol.

An immediate result of the synchronous batch execution is that all possible transactions are executed regardless of distribution of a specific exchangeable type orders among exchanges and according to SEC regulations, including Reg NMS. In contrast the continuous distribution of orders to individual exchanges would lead to races and failed transactions because of the colliding orders send to same exchange while another exchange could have plenty of matching orders for exchangeable type sale or purchase and also due to the fast and unpredictable change and distribution of price.

A preferred "what you see is what you get", WYSIWYG embodiment of SBE allows market participants to place and accumulate orders while market conditions are unchanged and see the result of their order under same conditions before placing a new order. The duration of a batch is controlled by a clock tick (1751). Even if the period is in fractions of a second it is meaningful to the ordering computers and electronic communications. Batch order processing inherently updates market status at discrete time moments. See FIG. 16, FIG. 17; 1710, 1720. This method allows an idle time (FIG. 16, 1780) for analyzing the result of orders and placing new orders under latest market conditions published at the end of processing stage. (FIG. 16, 1720). Machine algorithms can invest quasi deterministically, step by step. It is guaranteed that nobody can execute faster than the general clock and that updates are made only once every clock period, at the end of processing (1710, 1720). A multitude of new trading and financial strategies can be created and deployed under guaranteed fairness.

Another SBE embodiment processes order batches back to back without idle time, fully loading the exchanges and the communication channels. Immediately after finishing execution of a batch, for example batch N in FIG. 17, 1730,1740,1750, it will start processing the next batch N+1 (FIG. 17, 1732,1742,1752). FIG. 17 shows a two steps SBE pipe. Investors' orders placed at any time will accumulate in a batch during the first step and would be processed during the next clock cycle.

Yet another maximum efficiency embodiment has all the steps of the processing piped. Each step is competed during a clock period. The clock period can be reduced to very small time periods. For illustration purposes and without reducing from generality we consider a four stage cycle (FIG. 18). the first stage is accumulation of orders (1781), second stage (1782) is matching orders (both new orders and incomplete orders from previous time interval), third stage (1783) is execution of the matched orders at the respective exchanges, and the fourth stage (1784) is sending the completion information to the brokers and updating the SIP for the next cycle. The N in FIG. 18 represents the number of the clock cycle, or execution cycle and also an index for the order batch.

Longer SBE clock periods would lead to a stable, relatively uneventful market behavior due to increased number of orders in a batch that can be matched with each other. Shorter clock period would increase the dynamic response and induce price variations and instability in the market.

Timestamp based timing synchronization requires oscillators with stability better than the maximum specified error of every system, during the period of computing a new correction factor. Our method uses the invariant measurement system to obtain stable oscillators.

An embodiment of the invention, comprising a set of observable entities measures relative changes of the observables and selects entities with the smallest relative change. Another embodiment calculates a common, most stable value from the selected observable measurements and adjusts the value of the observables to match the common value. Anything that can be measured, such as time, temperature, voltage, resistance, capacity, elasticity, power, speed, acidity, color, radiation, absorption, or any economical, social or biological parameters is an observable. The method relies entirely on relative measurements. The principle is that observables that drift less relative to each other are also less likely to drift in absolute value. Also there is a higher probability that one, or a minority of observables from a set will change during a measurement cycle than the probability that a majority of observables will simultaneously change by similar value.

Another embodiment distinguishes measurement noise from actual jumps in value of a measured observable. This method produces a stable observable by selecting and combining relative measurements of observable of entities and compensates for their change. Without reducing from generality, we will further refer to an observable as a "frequency" and refer to a measured entity as an "oscillator". The methodology described can be applied to the other observables and entities as well.

Oscillators change their frequency for both known and unknown reasons. Our method generates a stable frequency by selecting the most stable subset of oscillators from a set of oscillators. Drifting oscillators are corrected to the stable frequency.

Figure 3:
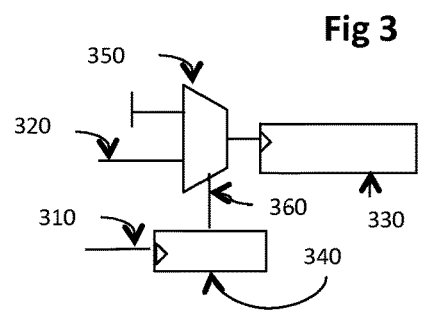
FIG. 3 shows an example of a counter

An embodiment measures a frequency $Fn$ by counting $Fn$ (FIG. 3, 320) during a counting period triggered by signal 360, obtained by dividing another frequency $Fs$ (310) by its nominal, expected value. Without reducing from generality, we represent a frequency, $Fn$ as the sum of a Nominal Frequency $N0$ and an error, $errFn$. $Fn=errFn+N0$, [4]. Similarly we consider another frequency $Fs=errFs+N0$. If $errFn=0$ then dividing $Fs$ by $N0$ will produce a perfect 1 Hz frequency with a period of 1S, $T1s$, that could be used as a gating signal for a counter indicating frequency. In a reality $T1s=N0/Fs=N0/(N0+errFs)$, [1]. If we count the number of periods of $Fn$ during a $T1s$,1S interval we obtain $Fn*T1s=(N0+errFn)*(N0/(N0+errFs))$, [2]. As $errFs$ is assumed to be significantly smaller than N0, we approximate $N0/(N0+errFs)=1/(1+errFs/N0)\tilde{}=1-errFs/N0$, [3]. Applying [3] to [2] it results $(N0+errFn)(1-errFs/N0)=N0+errFn-errFs-errFn*errFs/N0\tilde{}=N0+errFn-errFs$ [5], because $errFn*errFs/N0$ is a second order of magnitude error since the $errFx$ is less than 50 ppm from N0. A frequency meter has the architecture described in FIG. 3 wherein $Fs$ (FIG. 3, 310) is a calibrated frequency, with $errFs=0$. In conclusion the measurement of a frequency $Fn$ relative to a frequency $Fs$ produces $N0+errFn-errFs$, wherein N0 is the nominal value of $Fs$ and $Fn$.

Another embodiment measures $Fn-Fs=errFn-errFs=errFns$ and calculates $d(errFxyt)=errFxy(t)-errFxy(t-1)$, the relative change between an current $errFxy(t)$ and the previous $errFxy(t-1)$ measurement interval errors, wherein x an y are any different combination of n,m,s frequency indexes, and t is the time at the end of the current measurement cycle.

Figure 8:
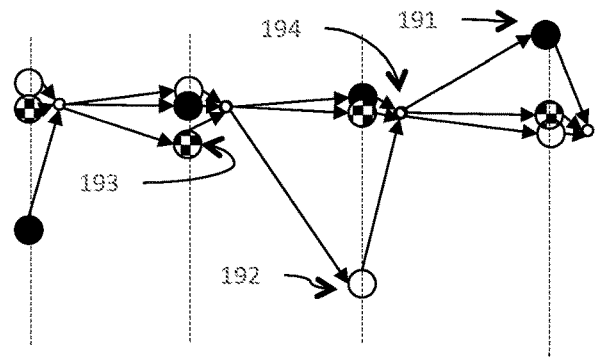
FIG. 8 shows an example of invariant measurement common frequency

Another preferred embodiment will bring all the frequencies to a common value, $ComF$ by applying a correction factor $CFx$ to each $Fx$, wherein $x=m,n,s$, at the end of a measuring cycle. (FIG. 8). At the end of the next cycle, it will select the most stable pair of frequencies, with the minimum change in frequency relative to each other at a time "t" $minFxy(t)=min(abs(errFnm(t)), abs(errFms(t)), abs(errFsn(t))$. As the system does relative measurements it cannot deterministically establish which of the two frequencies, $Fx$ or $Fy$ actually changed less, and will determine a most probable stable frequency. An embodiment will calculate half of the average of the two closest frequencies, m,n and use it to correct the frequencies to a common value for all frequencies: $Fn(t+1)=Fn(t)-(errFnm(t))/2$; $Fm(t+1)=Fm(t)+(errFnm(t))/2$ [6]; $Fs(t+1)=Fs(t)-(errFns(t)+errFms(t))/2$. All equations represent the common frequency value.

Another preferred embodiment will select as the common frequency, the frequency with the highest probability to be stable. The probability is the number of times that frequency (or oscillator) was selected as part of the most stable pair or pairs of frequencies by a measurement cycle divided by double the number of measurement cycles.

Figure 9:
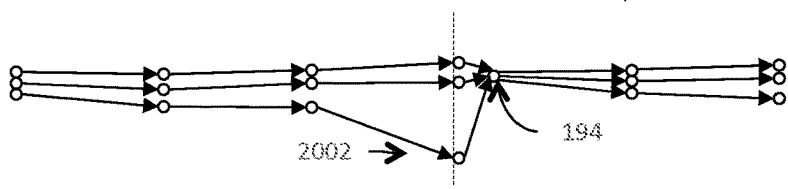
FIG. 9 shows an example of invariant measurement system

Frequency transitions could be also caused by sudden changes in the environmental conditions. One embodiment has different paths with different propagation delays for environmental perturbations (see FIG. 9) to the oscillators, that allows correction of drifting oscillators as the perturbation propagates.

The $Fm$, $Fn$ measurements relative to another frequency $Fs$, will be $Fm=N0+errFm-errFs$, [8] and $Fn=N0+errFn-errFs$, [9], where $errFm$ and $errFs$ are the frequency deviation from the nominal value N0. In general $Fi=N0+errFi$, [10]. For $i=m,n,s$ it results $Fm-Fn=errFm-errFn$, [11]; $Fn-Fs=errFn-errFs$, [12]; $Fs-Fm=errFs-errFm$, [13]. One embodiments calculates the common frequency as a weighted average of selected frequencies having the smallest relative change and determines correction factors applied to individual frequencies as $CFn=(Fn-Fx)*SUMn/(SUMn+SUMx)$. Wherein, x is the paired frequency and $Fn-Fx$ is the relative frequency measurement. If $Fn$ is not part of a selected pair (x,y) then $CFn=((Fn-Fx)*SUMn+(Fn-Fy)*SUMy)/(SUMx+SUMy)*AttenuationFactor$. Wherein $SUMn$ is the number of times $Fn$ was part of a selected pair of frequencies with minimum relative change. Note the only the relative difference of frequencies is available for calculations. Absolute values are not determined.

An embodiment computes a common frequency (FIG. 9, 194) applies the frequency corrections, $CFi$, ($i=m,n,s,\ldots$) to the oscillators only if any of the relative frequency variations, $Max(Fx-Fy)$ is bigger than a threshold. This prevents unnecessary accumulation of errors caused by noise. (see FIG. 9).

Computations based on relative, differential data accumulate errors. Baseline Convergence is a long term, asymptotic corrosion of the accumulated correction factors, ACF towards a stable frequency. An adjustable Baseline Convergence Factor, BCF is subtracted from all the frequencies at every cycle, pulling frequencies close to the actual stable frequency Fs.

Another embodiment is applied to observables used by network synchronization protocols. Correction factors for timing synchronization calculated over noisy links will have bigger relative changes. The Invariant Measurement Method will select correction factors with minimal relative fluctuations associated with stable propagation delay links and stable references The array of increased stability (that could be used for stable physical parameter sources) is separated by the environment through discontinuities taking the shape of a spiral or interlaced combs (FIG. 25, 26) (1100). The discontinuities create barriers in the propagation of the environmental conditions by increasing the length and reducing the section of the propagation path.

Figure 22:
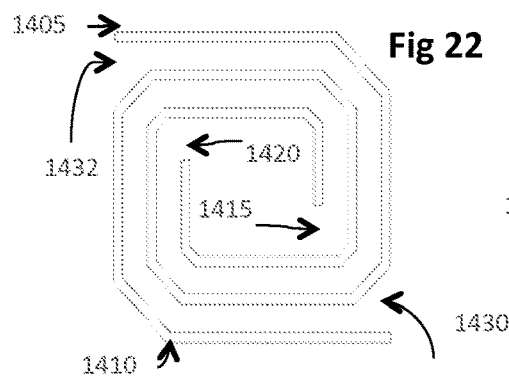
FIG. 22 shows an example of double arm spiral discontinuity.
Figure 23:
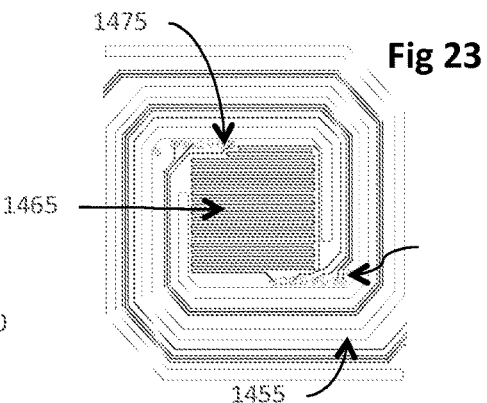
FIG. 23 shows an example of embedded winding traces for thermal heating
Figure 24:
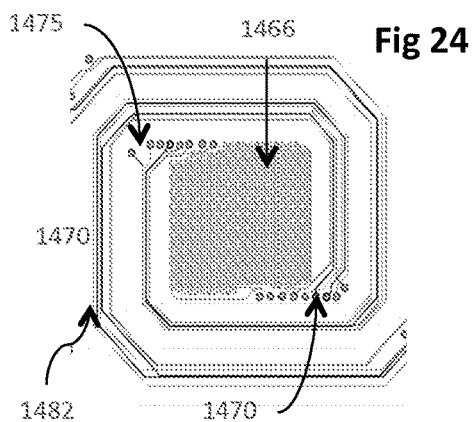
FIG. 24 shows an example of embedded winding traces for thermal heating on several layers.
Figure 26:
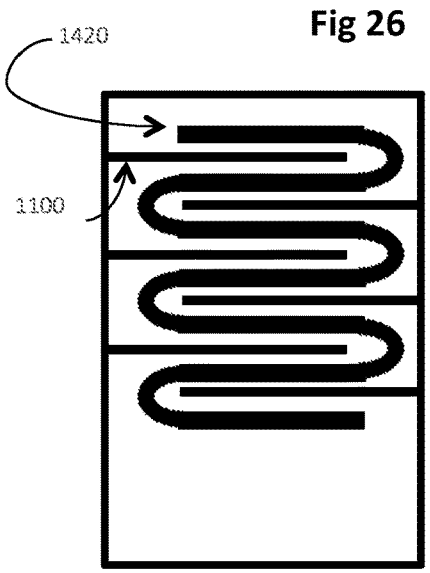
FIG. 26 shows an example of comb discontinuity topology

One embodiment of our invention uses traces of an electronic printed circuit board (PCB) as the uniform heater plate for both the oscillator and the temperature sensor that is lower cost and easier to manufacture than a heating element surrounding the heated area like a quartz resonator. The resistivity of thin conductor traces, packed closely together in winding shapes to obtain the desired trace length according to the resistivity required to generate heat. The spiral or interlaced comb shape (FIG. 26, 1100), (FIG. 22) of discontinuities in the propagation path of heat have similar effects for other physical properties other than heat. For instance mechanical vibrations, humidity, contaminants that can crawl on the surface of materials are attenuated by the use of this technology restricting the conductive path.

The parameter controlled in one embodiment of this invention is temperature. Cu traces that normally are etched on a PCB are used on one or several layers of the PCB to bring the temperature to the stable lever required. The necessary length of the trace (required to obtain optimal resistivity considering the voltage and power conditions) is achieved by winding traces and packing them for closest proximity.

The embodiment isolates an area from external environment perturbations by creating spiral or winding propagation barriers that create longer and narrower the propagation path between the protected area and the environment that create higher thermal and mechanical resistance. In addition the barriers allow preferred positioning of the ports of entry to the protected area and also preferred positioning to the connecting ports to the environment domain and avoid high sources of perturbation spots on the PCB. In an embodiment considering mechanical reliability of the device, the barriers should end at quasi symmetrical points relative to the protected area. (see FIG. 25).

An embodiment of a subsystem that depends on another measurable environmental condition limits the speed of change of the environmental condition. One way is to isolate the subsystem from the environmental conditions that increase the equivalent resistance for that condition that increases the time constant of the transfer function for the environmental conditions. The transfer function can be approximated with a low pass filter. In embodiment temperature is the environmental measured parameter and the temperature is the measured parameter of the subsystem. Short term frequency stability of an oscillator implies limiting the speed of temperature change. We increase the time constant of the low pass filter for heat propagation (that is modeling the connection to the environmental conditions) by increasing the thermal resistivity or by increasing the thermal capacity of the subsystem or by a combination thereof. The thermal capacity can be increased by adding a high specific heat mass to the short term stability subsystem (center of the spiral see FIG. 22). An embodiment uses water or hydrogen to increase thermal capacity. The isolation or thermal impedance can be increased by lengthening and narrowing the communication path for the environmental perturbations.

Figure 25:
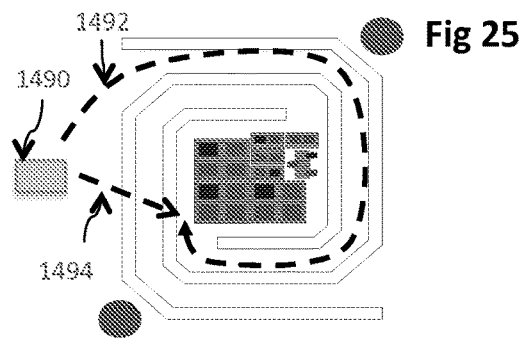
FIG. 25 shows an example of spiral discontinuity topology
Figure 27:
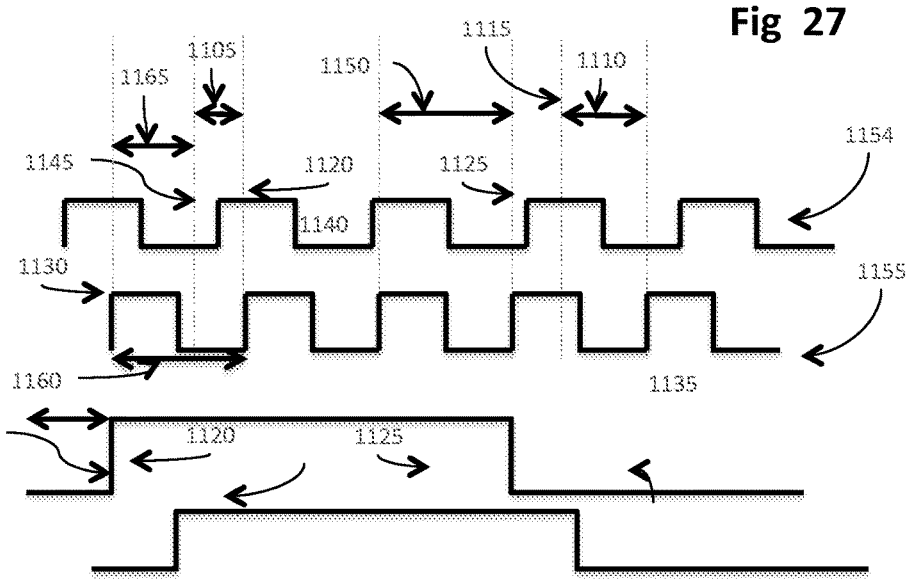
FIG. 27 shows an example tapped delay line fractional measurement.

We create high thermal impedance barriers by making spiral like cuts (1410) in the PCB that direct propagation of heat, vibrations and other physical properties through a longer and narrower path that increases the isolation. The barriers change the propagation path from a straight line (1494) to a spiral (FIG. 25, 1492). The isolating path and attenuation factor for perturbations increase proportional with the length of the spiral arms and with the isolation between arms of the spiral and inverse proportional with the arm width and thickness. In a preferred embodiment the impedance barrier consists of cuts filled with air. The cuts introduce barriers of air with higher resistivity to environmental perturbations. The heat will follow the lowest thermal impedance path and travel through the arms of the spiral. The barriers extend the length of the propagation path to the sources of perturbation associated with the rest of the board. Moreover, when an oscillator is thermally isolated, even without active temperature stabilization, the frequency control algorithms perform much better because the lower speed in temperature fluctuations.

An embodiment of our invention uses regular (usually Cu) traces from one or multiple layer of the PCB as a resistive element that produces the heat necessary to maintain a constant temperature for the oscillating element (1465). A temperature sensor, placed in the proximity of the oscillator is used by a feedback loop to maintain a constant temperature by adjusting the current in the resistive element. The resistive element distributed on a PCB layer create a heated surface with uniform temperature distribution for all the parts placed on that surface (1465, 1466). The heating element is embedded in the PCB layers and provides uniform temperature to the oscillators and the thermal sensors that control the stable temperature. See the elements 1012, 1013 and 1014. Heating is produced by the resistivity of the thin winding copper traces routed as a snake shape (FIG. 25, 1465, 1466). The embedded heating snaking or winding shaped traces can be placed on different layers. They could be laid at 90 degrees on adjacent layers (1466). The switching and control device, controlling the current through the resistive elements, could also be placed on the headed area. Colocation increases efficiency but creates a heat gradient in the switching device. An embodiment provides a better matching between the temperature of the sensor and the temperature of the oscillator due to the parallel heat propagation paths topology. The thermal conduction path between the heater and the sensor as well as heater to oscillator (bot on the top layer of the board) is shorter and symmetrical (almost identical) than for other solutions. This improves the response of the temperature control loop. Another embodiment conveys heat through infrared radiation generated by the hot traces that travels through the epoxy and glass material of the board and heats directly both the sensor and the oscillator packages. Higher transparency to infrared PCB materials would provide better thermal control. An embodiment of this invention needs no additional heating elements.

Figure 4:
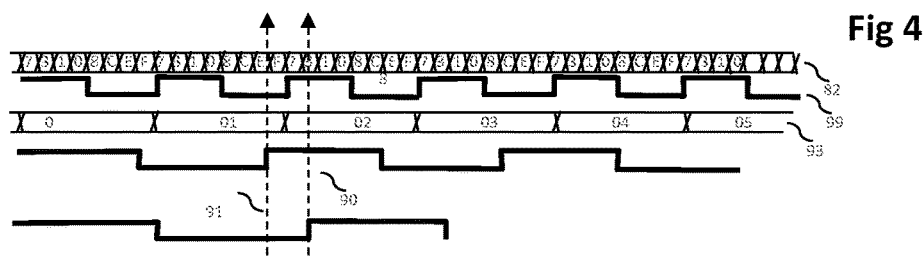
FIG. 4 shows an example of fractional counter

Timestamping precision is limited by the period of the clock (quantization errors) that clocks the time counter. A clock timestamping device does not differentiate events that occur between the measured clock active edges. A tapped delay line (TDL) has lower quantization error of the delay cell tap. The TDL is a pipe of delay cells (FIG. 4, 82). Each delay cell (DC) output is available for connecting to individual latch registers. (FIG. 4). An embodiment of this invention uses a free running Tapped Ring Oscillator (TRO) comprising a TDL and an inverter connecting an output of a DC to the input of TDL and registers that can latch the output of each DC and take a snapshot of the wave traveling in the circular TDL pipe (TRO). The TRO is an equivalent high frequency counter with a period equal with a tice the delay of total number of delay cells in the TDL.

Another embodiment provides a Tapped Delay Line (TDL) taking its input from an external oscillator. The propagation time through the entire length of the delay line should be longer than the half of sum of the maximum period of the input signal and the maximum jitter. Yet another embodiment has the TDL configured as a ring oscillator.

In one embodiment a frequency Fm is driving the tapped delay line (FIG. 1, 91). The active edges of clock frequency Fn and Fs are latching (92) the TDL and the eventual Counter (93) clocked by Fm as N2 and N3. The ratio between N2 and N3 is the ratio between Fn and Fs. Without reducing from generality we can also consider that Fn and Fs can be the actual or a divided version of the Fn and Fs. Fm can also be any of Fn and Fs. Both the active and passive edge can be used to latch the TDL (82, 88 and the cycle counter 93).

An embodiment can timestamp the TDL with three frequency signals. This will create a three relative frequency meter that will measure dFmn and dFms. dFns=dFms− dFmn. Applying the principle that only one frequency changes within one measurement cycle the one frequency that drifted can be identified and corrected virtually or absolutely.

These methods provides a fractional, high precision measurement or comparison of one or more frequencies or oscillations. If one of the multiple frequencies has a known accuracy relative to an etalon then the measurement is the actual frequency.

Figure 5:
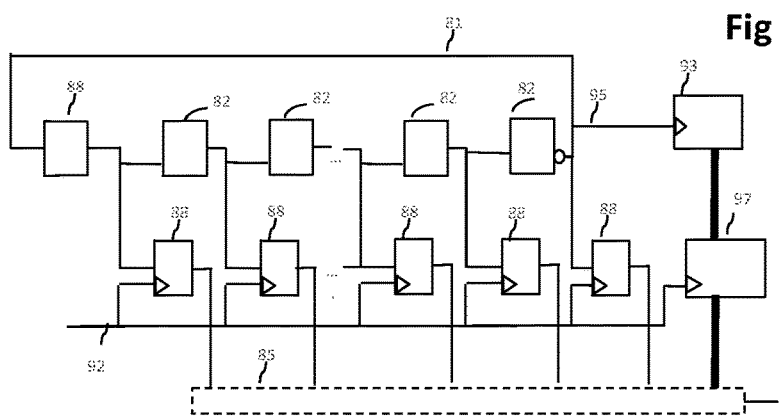
FIG. 5 shows an example of fractional counter
Figure 6:
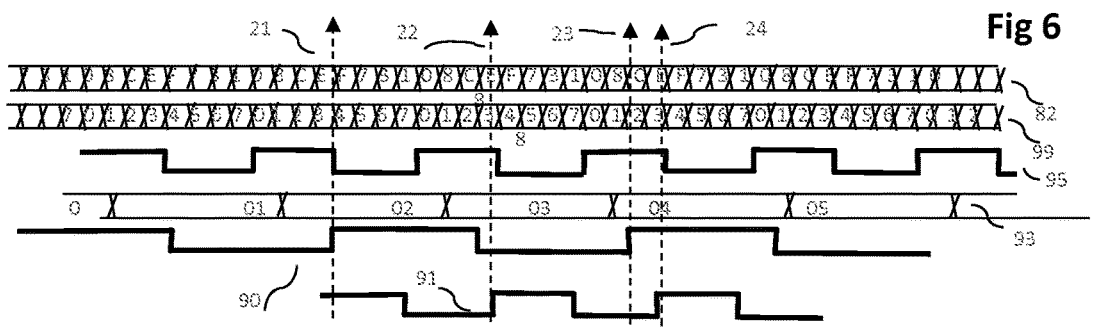
FIG. 6 shows an example of fractional timestamping

A preferred embodiment of the invention comprises a TRO and an associated counter for the TRO cycles (TROC) and a register that latches the status of the TRO or STRO taps on the active latch of a measured frequency. Additionally the embodiment could comprise any of the following: a counter (FIG. 5, 93) of tapped ring oscillator cycles, an input event or frequency counter (63) or divider, a communication block (85) to a CPU or Arithmetic Logic Unit (ALU) that performs the calculations to determine the fractional timestamp and frequency values relative to a reference timing system, additional register stages for latching the TRO counter (93) or the measured frequency counter (63), a converter of the TRO status to a binary code that can be done either in HW or SW, and a control block Taps (FIG. 1, FIG. 4, FIG. 5, 61) are provided at each delay cell (82) and are connected to the input of a latching register (88). One of the TLD taps provides the clock for a counter (93) that measures the number of TRO full cycles. Events to be timestamped or frequencies to be measured are providing the latching pulse (or clock) for the latch register (92). If the delay cells (DC) have similar delay than one frequency can be measured by determining its period by counting the number of delay cells that the signal traverses and multiplying that number with the known delay. The TRO latching pulses (92) can be generated or enabled by a CPU program or they can be generated automatically by dividing the measured frequencies 90, 78, 76, etc. A longer period between latching pulses will increase the accuracy of the measurement. The latched TRO status can be transferred to a CPU that can request a new latch on an active edges of an input signal. Another embodiment has a transmission unit (85) that passes latched data to a communication path to the CPU for arithmetic operations. Additional logic could also make corrections when converting TRO snapshot to accurate fractional period by considering delay variations for individual DCs. A digital counter block connected to an input frequency (FIG. 1, 63) can also be latched in registers (98). The CPU can trigger TROC latching by selecting one of the inputs or a numerical division of the inputs as latching pulse.

Optionally a fraction encoding logic (FEL) can convert the status of the TRO, the propagation of the self oscillating tapped delay line (TDL) to a binary number indicating the number of delay taps (DT) the signal propagated through or the actual fraction of the period of the TRO cycle. The FEL can be implemented in software in a CPU. A TRO cycle is defined by a full rotation of the wave in the concatenated TDL. Without reducing from generality we consider the initial state of the TDL as all "1", a taped delay cell of 0.5 nS (ASICs are much faster) and a total of 4 delay cells. A TDL with N taps has a total number of 2*N different snapshots, and an oscillating period equal with twice the total delay of delay cells. The sequence of snapshots in hexadecimal representation is 0,8,C,E,F,7,3,1. that corresponds to the fractional period of ⅛, ¼, ⅜, ½, ⅝, ¾, ⅞. In our example 8 states can be encoded with 3 bits. After reset the state will be 0000 (converted to 0 by FEL). A latch pulse received one tap delay after the reset, loads latches with 1000, (FEL returns 1). Another latch pulse received 2 nS (or four delay taps) after power-up will load latches with 1111 (FEL=4). After 3 nS (moved over 6 TDs) would load 1100 (FEL=6). See FIG. 2. The counter (93) is incremented once every full TRO cycle, 4 nS in this example. A latching signal takes a snapshot of the tapped delay line and of the eventual cycle counters (93 and 98). The snapshot is numerically processed. Note that a 5 delay cells (DC) TRO will generate decimal fractions (increments of ¹⁄₁₀ of the TRO period). The actual number of taps is not important as all the arithmetic is relative to the reference signal.

An embodiment taking events snapshots of the TROC that use overlapping time intervals to make relative timing determinations reduces the errors generated by fluctuations of the DC because the fluctuations are present in both relative intervals and cancel each other.

Figure 2:
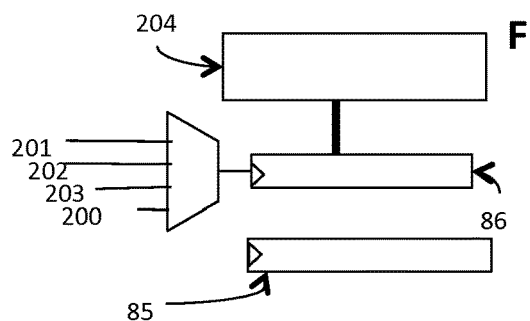
FIG. 2 shows an example of a relative frequency and fractional timestamping system

As example, consider a TRO with 4 DC and a cycle counter providing a minimum fraction of a period is 1/(2*4)=⅛ of the TRO clock. There are 8 discrete readable states of the TRO. Assume that logic scheduled a TROC latch on the next active edge of signal 90 and on immediately following edge of signal 91. Signal 90 latches "02" for the counter (93) and "E" for the TRO corresponding to ⅜ of a TRO period for a total of 16+3=19 DC (FIG. 2. 21). Signal 91 latches 03 and ⅜ for a total of 3*8+3=27 DC. (FIG. 2. 22). And the operation repeats returning snapshots 04 and ⅖ for 34 DCs (FIGS. 2. 23) and 04 and ⅜ for 35 DCs. (FIG. 2. 24). The snapshots 21 and 23 are for a period of signal 90 and snapshots 22,24 are for a period of signal 90. Then we can find the fractional ratio of the two signals by dividing the differences of snapshots of signal 90 by the snapshot difference of signal 91: (34−19)/(35−27)=15/8=1.875. The overlapping time interval is 34−27=7 DCs. The parasitic, permanent fluctuations of the tapped delay cell (TDC) will be eliminated by the relative nature of the comparative process. Fluctuations will be included in overlapping measurement time and will be eliminated when calculating the relative difference or ratio of time intervals.

Another preferred embodiment has the latching pulses of the measured frequencies as close as possible to each other to maximize the overlapping section of the measurement. Another embodiment has separate latching registers for each measured frequency.

Yet another embodiment counts the clocks (Ni) of a measured frequency (Fi) and simultaneously latches the TRO or TROC and the Ni. Then latched snapshots are sent to a the CPU that can determine an equivalent TRO count for a different time interval by multiplying that new time interval with the value of the difference of Latched TRO and dividing it with the value of the difference of Fm counter wherein the difference is between two latching events (LE).

An embodiment divides an input frequency by an number Nx before reaching the fractional frequency meter, Another embodiment has an input, Fx clocking a counter, FxCtr that is latched at the same time with the tapped delay line synchronous with Fx clock. A CPU can count the difference between FxCtr readings and can determine the number of clock cycles between readings (latches). Determination of the number of bits for the Counter.

The counter must not wrap around during a time period equal with the (maximum measurement time)*(Maximum error of the CPU clock+maximum error of the TRO).

Figure 7:
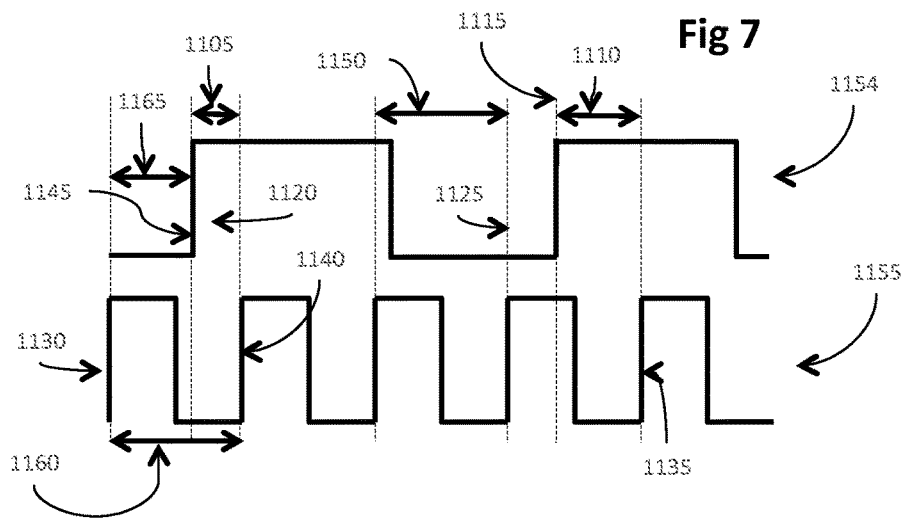
FIG. 7 shows an example of fractional timestamping

An embodiment of this invention provides fractional timestamping of an event 1154 (specifically the transitions 1145, 1115) relative to a reference clock Fs (1155). To measure a time interval we count the reference clock periods in between the starting (1145) and ending (1115) events of the interval to be measurement. Without reducing from generality we will consider the rising edges as the active edges of both the signal and the reference clock. For a fractional measurement we will timestamp the TRO on the active edge of the signal (1145) and immediately we timestamp again the TRO on the following active reference clock edge (1140). We end the cycle by timestamping the TRO on 1115 edge of the signal and timestamping the TRO again on the immediately following active edge of the reference clock 1135. The first fractional measurement (1105) will be difference between the first timestamps TS(1140)−TS(1145). The second fractional measurement will be 1110=TS(1135)−TS(1115) wherein TS(z) is the reading of the TRO when event z occurs. The full fractional measurement will be the number of reference clock periods (three in FIG. 7) plus the first fractional measurement, 1105, plus a reference clock period, 1150 minus the training fractional measurement, 1110.

A fractional timestamp relative to a reference clock (1155) of an event (1145) will be the ratio of the duration between an active edge of the event and a first following active edge of a reference clock divided by the duration of the reference clock period. That is 1105 divided by 1150 according to FIG. 7. The integer part of the timestamp is the number of local full reference clock periods measured from the origin of time.

Timestamps consists of and integer number of reference clock periods (Ns) and a fractional part. The factors of the fractional part are constructed from concatenation of the eventual TRO counter as MSB and the fractional encoded snapshot of the tapped delay line of the TRO as LSB. There are many ways of constructing the fractional part. Without reducing from generality we consider the sequence of timestamping as the timestamp of the signal event (TS1) immediately followed by the timestamp of the next active edge of the reference clock (TS2). The fractional timestamp is N1+(TS2−TS1)/TSc, wherein TSc is the TSn−TSm/(n−m) and wherein TSn and TSm are timestamps of the active edges n and m of the reference clock signal. TSc is the period of the reference clock signal measured in TRO units, defined as numbers of tapped delay cells.

An embodiment of a frequency meter uses a relative frequency counter and an accurate reference frequency that can come from several sources including the Generalized Timing Synchronization. The fractional part of a timestamp is represented by a ratio of tapped delay line units. The divider is the period of the reference clock signal represented as the number of tapped delay units with the same delay as the reference clock period. Implementations could use a TRO or a TROC.

PD1. A method for calculating a propagation delay, comprising:
transmitting, by a first node, a first data signal to a second node at a first departure time;
reflecting part of the first data signal by a reflecting device at the second node;
receiving, by the node, said part of the first data signal at a first arrival time; and
calculating a propagation delay based on the first departure time and the first arrival time.

PD2. The method according to PD1, wherein the reflecting device is a mirror.

PD3. The method according to PD1, wherein the propagation delay is a half of the difference between the first arrival time and the first departure time.

PD4. The method according to PD1, wherein the propagation delay is the sum of a constant and a half of the difference between the first arrival time and the first departure time.

PD5: The method according to PD1, further comprising:
transmitting a second data signal from one of the first node or second node, at a second departure time;
receiving the second data signal respectively at the other second node or at the other first node, at a second arrival time;
correcting the timing at the one of the first and second nodes based on the second departure and arrival times and the propagation delay.

PD6. The method according to claim 5 wherein the timing correction of a node further comprises the step adding the propagation delay, subtracting the second arrival time and adding the second departure time.

PD7. A measuring apparatus for determining timing delay, comprising:
first transmitting unit, configured to transmit a first data signal to a second node at a first departure time;
first receiving unit, configured to receive part of the first data signal reflected back from a reflecting device at the second node; and
first calculating unit, configured to calculate a propagation delay based on the first departure time and the first arrival time.

PD8. The measuring apparatus according to PD7, wherein the first data signal is in a form of laser or light and the reflecting device is a light reflecting device or a mirror, or the first data signal is in the form of electric signal transmitted on wires and the reflecting device is a device with a different impedance relative to the impedance of the wires, or the first data signal is in the form of microwave and the reflecting device is a microwave reflecting object.

PD9. The measuring apparatus according to PD7, wherein the propagation delay is a haft of the difference between the first arrival time and the first departure time.

PD10: The measuring apparatus according to PD7, wherein the propagation delay is the sum of a constant and a half of the difference between the first arrival time and the first departure time, and wherein the constant is a measure of the difference in propagation time between the transmitting, first node and the reflecting device and the propagation time between the transmitting, first node and the input of the second node.

PD11: The measuring apparatus according to PD7, wherein the first transmitting unit is further configured to receive a second data signal as well as a second departure time of the second data signal departing from the second node and to determine a second arrival time of the second data signal arriving at the measuring apparatus; and
  wherein the first calculating unit is further configured to correct the timing at the measuring apparatus based on the second departure and arrival times and the propagation delay.

PD12. A measuring apparatus for determining timing delay, comprising:
  second receiving unit, configured to receiving a first data signal from a first node;
  wherein the second receiving unit has a reflecting device, configured to reflect part of the first data signal back to the first node for calculating a propagation delay.

PD13: The measuring apparatus according to PD12, wherein the first data signal is in a form of laser or light and the reflecting device is a mirror, PD14: The measuring apparatus according to PD12, wherein the propagation delay is a half of the difference between the first arrival time and the first departure time.

PD15: The measuring apparatus according to PD12, wherein the propagation delay is the sum of a constant and a half of the difference between the first arrival time and the first departure time.

PD16: The measuring apparatus according to PD12, wherein the second receiving unit is configured to receiving a second data signal, and
  wherein the measuring apparatus further comprises a correction unit configured to correct the timing at the measuring apparatus based on a second departure and arrival times and the propagation delay, wherein the second departure time is the time of the second data signal departing from the first node and the second arrival time is the time of the second data signal arriving at the measuring apparatus.

GTS120. A timestamping method comprising the steps:
  timestamping a data packet at a first port belonging to its propagation path;
  timestamping the data packet at a second port; belonging to its propagation path;
  generating an identifier from the data packet at the first port;
  generating the identifier from the data packet at the second port; and
  sending the identifier and the timestamp from the first port to a processor, or sending the identifier and the timestamp from the first port to a processor and sending the identifier and the timestamp from the second port to the processor.

GTS122. The method of GTS120 wherein the packet identifier is created from the packet IP header or a compression of the packet IP header, or a checksum, or a hash, or a cyclic redundancy check of the packet, or of the packet header, or another parameter of the packet, or a combination thereof.

GTS 120B. GTS120 further comprising the step of pairing timestamps with the same packet identifier GTS 121A. timing synchronization apparatus comprising:
  first timestamping unit configured to timestamp with a first timing data packets arriving or departing from a first port;
  packet identifier first unit configured to create packet identifiers from data packets;
  first transmitting unit, configured to transmit to a process a metadata packet comprising timestamps from the first timestamping unit and corresponding packet identifiers from the first packet identifier unit;

GTS 124. timing synchronization apparatus comprising
  a receiving unit configured to receive metadata packets comprising timestamps and associated packet identifiers;
  a pairing unit configured to pair timestamps generated by the same packet or pair timestamps associated with the same packet identifier;
  a processing unit configured to compute frequency correction factors or phase correction factors from paired timestamps.

GTS125. timing synchronization apparatus comprising:
  the apparatus of GTS121A and the apparatus of GTS124.

GTS126. timing synchronization apparatus of GTS125 further comprising:
  second timestamping unit configured to timestamp data packets arriving or departing from a second port;
  packet identifier second unit configured to create packet identifiers from data packets;
  second transmitting unit, configured to transmit to a process a metadata packet comprising timestamps from the second timestamping unit and corresponding packet identifiers from the packet identifier second unit;

GTS 123. The method of GTS120B further comprising computing of a correction factor for synchronizing the second node relative to the first node from the timestamps.

GTS 176. A system for pairing timestamps comprising the steps:
  receiving a first timestamp and a first: Identifier generated for a first data packet at a first port;
  receiving a second timestamp and the first identifier generated for the first data packet at the second port;
  receiving a third timestamp and a second identifier generated for a second data packet at the first port;
  receiving a fourth timestamp the second identifier generated for the second data packet at the second port; and
  pairing the first and the second timestamps having the same first identifier, and
  pairing the third and the fourth timestamps having the same second identifier.

GTS 177. The previous system further computing a correction factor of the second port timing relative to the first port timing, from the paired timestamps, wherein the correction factor, CF has a frequency correction factor, CFF component and a phase correction factor, CFP component;

GTS 176. The method of GTS177 further comprising the step of synchronizing timestamps taken in the second port time domain to the first port time domain by adding the phase correction factor, CFP component of the correction factor, CF to the timestamps, or multiplying the interval between two timestamps with the frequency correction factor, CFF component of the correction factor, or both.

GTS 179. The apparatus of GTS124 further comprising a timestamps retiming unit configured to retime timestamps received in metadata packets or directly received from a local port with the correction factor computed from the metadata packet or computed from timestamps directly received from a local port.

GTS 180. The system of GTS176 further comprising the steps.
receiving a fifth timestamp taken with the second timing domain, and the first identifier generated for the first packet at a third data port;
receiving a sixth timestamp taken with the third timing domain, and the first identifier generated for the first packet at the fourth data port;
receiving a seventh timestamp taken with the second timing domain, and the second identifier generated for the second packet at a third data port;
receiving an eighth timestamp taken with the third timing domain, and the second identifier generated for the second packet at the fourth data port;
pairing the fifth timestamp with sixth timestamp having the same, first identifier; and
pairing the seventh timestamp with the eight timestamp having the same, second identifier;

GTS 180C. The method of GTS180 further comprising:
calculating a direct propagation delay by subtracting the first timestamp from the sixth timestamp, adding the third timestamp and subtracting the fifth timestamp.

GTS 180B. The apparatus of GTS125 further comprising:
third timestamping unit that timestamps data packets arriving or departing from a third port;
packet identifier third unit configured to create packet identifiers from data packets;
third transmitting unit, configured to transmit to a process a third metadata packet comprising timestamps from the third timestamping unit and packet identifiers from the packet identifier third unit, or configured to transmit to the process a second metadata packet comprising timestamps from the second timestamping unit and packet identifiers from the packet identifier second unit;
receiving unit configured to receive metadata packets;
pairing unit configured to pair timestamps with the same packet identifier;

GTS 181. Method of GTS180 further comprising the step of computing a correction factor of the fourth port timing relative to the third port timing from the fifth, sixth, seventh and eight timestamps.

GTS 182, Method of GTS181 further comprising the step of computing a correction factor of the third port timing relative to the first port timing by multiplying the frequency correction factor of the third port relative to the second port with the frequency correction factor of the second port relative to the first port of by adding to the phase correction factor of the third port relative to the second port to the frequency correction factor of the second port relative to the first port.

GTS 182B The apparatus, of GTS121 further comprising a computing unit that computes a correction factor of the third port timing relative to the first port timing by multiplying the frequency correction factor of the third port relative to the second port with the frequency correction factor of the second port relative to the first port, or computes a phase correction factor of the third port timing relative to the first port timing by adding the phase correction factor of the third port relative to the second port to the phase correction factor of the second port relative to the first port.

GTS110. A method to synchronize daisy chained nodes comprising the steps:
calculating a first correction factors, CF1 synchronizing a second node to a first node;
calculating a second correction factor, CF2 synchronizing a third node to the second node;
and calculating a third correction factor, CF3 synchronizing a third node to the first node by combining the first correction factor, CF1 with the second correction factor, CF2.

GTS112. The method of GTS110 wherein combining correction factor comprises the steps of calculating combined phase correction factor by adding the phase correction factors, or calculating combined frequency correction factor by multiplying frequency correction factors, or both.

GTS128 A metadata packet payload comprising:
a first identification of a timestamped packet comprising an address of the source node interface, an address of the destination node interface, or a hash, or a compressed form of any thereof;
a second identification of a timestamped packet comprising a checksum, or a cyclic redundancy check, or a hash, or a packet sequence number or any similar information; and
a timestamp associated with the second identification.

GTS129. The payload of GTS128 further comprising an address of a port of an intermediate node or a compressed form of the address.

GTS131. The payload of GTS129 further comprising a timing correction factor used by the timing at the node where the timestamp was collected.

GTS140. A metadata packet payload comprises
a timestamp, an identification code for the packet that generated the timestamp, or difference between another timestamp and a previous timestamp and the identification number of the another packet.

GTS150. A method to authenticate nodes comprising the steps:
synchronizing the timing of a node to a timing reference by generating timing correction factors;
storing the correction factors and the time of generation;
use the pattern of correction factors variation in time to identify or authenticate the node.

GTS109. The previous claim wherein the corrected timestamps are further used in financial transactions, security, telecommunications, positioning and related applications.

GTS158. The apparatus of GTS121A wherein the process is executed by a cloud computing proxy node and can be assigned and reassigned according to the availability of the cloud computing resources.

GTS119. A method to verify the correct synchronization of a follower to a reference node comprising
modifying a frequency or a phase of a reference timing node by a minimal amount, wherein the minimal amount is above a noise level or is detectable by a follower node;
calculating a correction factor for a follower timing node;
measuring the delay and the amount of change of the correction factor; and
using the result for security and authentication.

SE80. A method for processing exchange orders comprising:
creating a first batch of orders by accumulating exchange orders received within a first time period, TP1;

creating a second batch of orders by accumulating exchange orders received within a second time period, TF2; and processing the orders from the first batch within the second time period, TP2;

SE81 The method of SE80 wherein the accumulation of a batch order and processing of a previous batch order start or stop at the same time.

SE82 The method of SE80 wherein the accumulation of a batch order and processing of a previous batch order start or stop at the same time for several networked exchanges.

SE83. The method of SE80 wherein the first and the second time periods are continuous, back to back.

SE 83A. The method of SE80 further comprising the step of updating the status or outcome of an order at discrete, predefined time intervals.

SE84. An exchange apparatus comprising
a first unit configured to perform accumulation of exchange orders in a batch;
a second unit configured to process the orders from the batch; and
a timing unit configured to synchronize the start or stop of the batch accumulation and the start or stop of the exchange process.

SE85. the apparatus of SE84 further comprising a communication unit configured to communicate with other exchanges or nodes information associated with the batch of orders necessary for matching or clearance;

SE86. A synchronous batch exchange system comprising:
passing a batch of orders synchronously through a processing pipe, one stage at a time, at a synchronized, clocked pace.

SE86A. A set of synchronous batch exchanges of SE86 further executing synchronously the same pipe stage at the same time.

SE87. A synchronous batch exchange method comprising the steps:
synchronizing the time of exchanges;
starting accumulating exchange orders at exchanges at time t1;
ending accumulating orders at exchanges at time t2;
processing the accumulated exchange orders at exchanges at time t3;
ending the processing of the accumulated exchange orders at exchanges at time t4;
starting transmitting execution confirmation for the processed orders at time t5; and
ending transmitting execution confirmation for the processed orders at time t6, wherein the processing cycle between t1 and t6 completes within a predefined time interval;

SE88 The method of SE87 or 80 wherein the processing further comprises matching orders accumulated at a set of exchanges interconnected with a data communication network.

SE89 The method of SE87 Order processing exchanges performing synchronously with the synchronized clocks.

SE90. A synchronous batch exchange method comprising the steps:
synchronizing the time of a first exchange, a second exchange and a home matching exchange;
accumulating in a first batch the orders received by a first exchange during a time period, TP;
accumulating in a second batch the orders received by a second exchange during the time period, TP;
transmitting the first batch orders to the home matching exchange;
transmitting the second batch orders to the home matching exchange;
consolidating orders from the first batch with the orders from the second batch; and
matching consolidated orders at the home matching exchange;

SE91 An exchange apparatus comprising
a first exchange unit configured to perform accumulation of exchange orders in a batch;
a second exchange unit configured to perform the exchange orders processing for the batch; and
a timing unit configured to synchronize the simultaneous start or stop of the batch accumulation and the step of the exchange process;

SE92. The method of SE90 further comprising the step of matching orders in the sequence of the time they were placed;

SE93. A method for timestamping a data packet comprising
synchronizing the time of a network node;
tapping a data packet on an interface port of a network node;
timestamping the data packet;
creating a unique identifier for the data packet;
transmitting to a central node the identifier and timestamp for the data packet, or
transmitting to a central node the identifier, the timestamp, and an identifier of the node for the data packet.

Invariant Measurement Method Oscillator Array

OA1. A method to generate a stable frequency from a set of frequencies comprising the steps:
measuring frequencies relative to each other;
identifying a pair of frequencies with the smallest relative drift to each other during a measuring cycle; and
calculating a common frequency from the pair.

OA6. An apparatus for generating a stable frequency comprising:
a set of oscillators generating frequencies;
a relative frequency counter configured to measure frequencies relative to each other;
a processing unit configured to identify a pair of frequencies with the smallest relative drift to each other during a measuring cycle and calculating a common frequency from the pair.

OA2. A method to generate a stable frequency from a set of frequencies comprising the steps:
identifying a pair of frequencies, or a subgroup of pairs of frequencies, having the smallest change relative to each other during a time interval;
determining a common frequency from one or both frequencies of the pair; and
adjusting the frequencies to the common frequency, wherein the adjustment is either physical or virtual by numerically accumulating correction factors.

OA7. The apparatus of OA6 further comprising a first control unit that adjusts a first frequency to the common frequency, either physically or numerically.

OA4. A method to determine the most stable frequency in a set of frequencies comprising:
counting a number of instances when a frequency is selected in a pair of frequencies with a smallest relative frequency drift; and
calculating a common frequency by a averaging or weight averaging the frequencies in the pair, wherein the weight of each frequency is a number proportional with the number of instances that the frequency was selected in the pair of frequencies with the smallest relative drift, or by selected the frequency from the pair with highest number of instances it was selected in pairs with smallest relative drift.

OA5. A method to identify the most stable oscillator from a set of oscillators comprising:
measuring the relative change in frequency for oscillators in a set;
determining a pair of stable oscillators, that have the least relative change in frequency during a time interval; and
counting a number of time intervals, K when an oscillator has been part of a pair having the least change in frequency.

OA9. The apparatus of OA7 further comprising a counter counting the number of time intervals, K when a frequency has been part of a pair having the least change in frequency.

OA20. A method to determine the most stable measure of a property for entities in a set comprising:
measuring a property for entities in a set over a time period;
identifying the most stable entities that have smallest measurement change relative to each other relative to a previous measurement cycle; and
calculating a common stable measure of the property from the identified measurements.

OA21. The method from the OA20 further comprising the steps:
determining a ratio by dividing the most stable common measure to an other measurement; and
multiplying the other measurement the ratio.

OA23. The method described by OA20, wherein the measurement is for a parameter of a communication path, or of an ecosystem, or of a network node, or is a measure of a phase, or of a frequency, or of a financial instrument, or a timing correction factor for timing synchronization calculated by a computer OA31. A method to provide a stable frequency from a set of frequencies generated by a set of oscillators comprising the steps:
measuring relative changes in frequency of oscillators;
identifying a subset of oscillators with the smallest relative change in frequency;
constructing a common frequency by averaging, or selecting from the frequencies in the subset;
correcting physically or virtually the frequency of the oscillators in the set to become equal with the common frequency,
calculating a common frequency by a averaging or weight averaging the frequencies in the pair, wherein the weight of each frequency is a number proportional with the number of instances that the frequency was selected in the pair of frequencies with the smallest relative drift.

OA33. The method of OA31, wherein the oscillators with the lowest variations to each other that are providing the stable frequency are selected with the formula min (abs (dFi−dFj)) or min (abs(dFi/dFj)), or min (abs(Fi−Fj)), or min (abs(Fi/Fj)), where i,j identify oscillators from the set, and wherein dFk is a time derivative or differential of Fk.

OA34. The method of OA32 wherein environmental conditions comprise temperature, voltage, radiation, humidity, pressure, vibration, weak forces, light, electromagnetic or other type of fields.

OA35. The method of OA31 where some oscillators use same physical media as a resonator or the frequencies are overtones of a fundamental frequency of the resonator.

OA36. The method of OA31 where the resonator is a quartz crystal.

OA39. A method to stabilize the frequency of a resonator oscillating on several frequencies comprising:
measuring several frequencies or combinations of several frequencies in relative to another frequency; and
selecting the frequency or combination of frequency that changed less as the stable frequency.

OA41. The method of OA39 wherein the common frequency is controlling the time interval to measure other frequencies or combination of frequencies.

OA43 The method of OA39, wherein the oscillator is a piezoelectric material and the several frequencies are overtones or are collected from independent electrodes or ports of the resonator.

OA48. A method to generate a stable frequency using a set of resonators comprising:
generating at least two frequencies from a resonator
generating a frequency difference by subtracting a multiple of a frequency generated from the resonator by another multiple of another frequency generated from the resonator, wherein the multiples are numbers including unity;
generating other frequency differences for other resonators in the set; and
finding the most stable frequency difference according to the method in OA31.

OA50. A method to create a resonator comprising the steps:
creating a first serial resonator by connecting M resonators in series, and
creating a first parallel resonator by connecting N first serial resonators in parallel; or
creating a second parallel resonator by connecting P resonators in parallel, and
creating a second serial resonator by connecting R second parallel resonators in series OA52. An oscillator that uses the resonator described in the OA50.

FC10. A fractional timestamping relative to a timing reference method comprising the steps:
Creating a ring oscillator from a tapped delay line (TRO);
Taking a first reference snapshots TR1 of the TRO at a time R1 of a reference timing;
Taking a second reference snapshots TR2 of the TRO at a time R2 of the reference timing;
Taking an event snapshots TE1 of the TROC synchronous with an event E1;
Calculating a delay of a TROC delay cell with the formula DC=(R2−R11/(TR2−TR1); and
Calculating the time of the event E1 relative to the reference timing using the formula RE=R2−TD*(TR2−TE1), wherein the first, and second reference snapshots, and the event snapshot are not restricted to such order or any temporal sequence;

FC2. A Tapped delay line relative frequency counter comprising the steps:
Feeding a tapped delay line (TDL) with a frequency signal F1
Feeding a period counter with the frequency signal F1
taking a first snapshot, S1 of tapped delay line and the period counter on an active edge of a signal E1:
identifying a relative position of the signal E1 within the period of the signal F1 from the TDL snapshot pattern; and
calculating a fractional timestamp from the relative position and snapshot of the period counter.

FC64. A method to measure relative frequencies comprising the steps:
Taking a first snapshot at an active edge of a first frequency of the status of a tapped delay line (TDL) fed by an external clock or a TDL looped back as a self oscillating Tapped Ring Oscillator (TRO);
taking a second snapshot at an active edge of a second frequency of another status of the TDL;
taking a third snapshot at another active edge of the first frequency of another status of the TDL;
taking a fourth snapshot at another active edge of the second frequency of another status of the TDL, wherein the first, second, third and the fourth snapshots are not restricted to such order or any temporal sequence; and
calculating the ratio of the first and the second frequency as the ratio between the number of taps the signal propagated through on TDL in between the first snapshot and the third snapshot divided by the number of taps the signal propagated through TDL in between the second snapshot and the fourth snapshot.

FC66. A frequency counter using a Tapped Ring Oscillator comprising:
Counting a Tapped Ring Oscillator periods with a first counter;
Counting the active edges of a frequency F1 with a second counter
Latching the status of the TRO and the first counter on an active edge of a first frequency as a first timestamp;
Latching the status of the TRO and the first counter on an active edge of a second frequency as a second timestamp;
Latching a status of the TRO and the first counter on an active edge of the first frequency as a third timestamp;
Latching the status of the TRO and the first counter on an active edge of the second frequency as a fourth timestamp,
wherein the first, second, third and fourth timestamps latch are not restricted to any temporal sequence; and
calculating the ratio of the first and the second frequency as the difference between the third and the first timestamps divided by the difference between the fourth and the second timestamps; or
calculating a first difference as the third minus the first timestamps of the first frequency, wherein the timestamps are separated by N cycles of the first frequency;
repeating the measurement and calculating a second difference;
calculating a first frequency absolute difference as and absolute difference between the second and the first difference;
repeating the same double difference procedure for a second frequency absolute difference; and
finding the smallest of the first frequency absolute difference and the second frequency absolute difference to determine the stable frequency.

FC70. A method to measure relative frequency comprising:
reading a timestamp, TS1F1 of a counter or a fractional counter, and of a counter of number of periods, N1 of a frequency F1 on an active edge of the frequency F1;
reading a second timestamp TS2F1 of the counter or fractional counter, and of the counter of number of periods, N2 of the frequency F1 on another active edge of the frequency F1;
reading a third timestamp, TS1F2 of the counter or fractional counter, and a counter of the number of periods, N3 of another frequency F2 on an active edge of the frequency F2;
reading a fourth timestamp, TS2F2 of the counter or fractional counter, and the counter of the number of periods, N4 of the frequency F2 on another active edge of the other frequency F2; and calculating the ratio of the frequencies as $((TS2F1-TS1F1)/(N2-N1))*((N4-N3)/(TS2F2-TS1F2))$.

TI1: A method for increasing the stability of a physical parameter of a device comprising the steps:
creating a stripe of discontinuity in the propagation path between a device and perturbing factors that changes the physical parameter of the device.

TI2: The method of TI1 wherein the stripe of discontinuity taking the shape of a spiral with one or several arms, and having the device in the center, or creating a snaking propagation path between the device and the source of perturbations.

TI3: Covering the device in the center according to the method of TI2 with a substance having high content of hydrogen, or hydrogel.

TI4: A method to heat a PCB component area comprising routing resistance controlled, winding PCB traces under the component.

TI5: The method of TI4 method wherein the heating traces are winding, or snaking while filling the surface under the component on one or several layers wherein the winding allows sufficient length for required resistance and uniform heat distribution.

What is claimed is:

1. A method for synchronization of computer systems linked through a communication channel comprising:
a) generating a first duplet comprising a departure timestamp and a departure packet identity when a data packet transmission event occurs at a first system;
b) generating a second duplet comprising an arrival timestamp and an arrival packet identity when a data packet reception event occurs at a second system;
c) generating a third duplet comprising a departure timestamp and a departure packet identity when a data packet transmission event occurs at the second system;
d) generating a fourth duplet comprising an arrival timestamp and an arrival packet identity when a data packet reception event occurs at the first system;
e) receiving, at a processing system, the first, second, third, and fourth duplets;
f) matching, by the processing system, departure packets identities with arrival packets identities within the first and second duplets;
g) matching, by the processing system, departure packets identities with arrival packets identities within the third and fourth duplets;
h) pairing for each matched departure and arrival packet identities, the departure timestamp with the arrival timestamp generated by the same data packet; and
i) computing a correction factor using the paired departure timestamp and arrival timestamp; and
j) synchronizing, using the correction factor, the times of the first and second systems.

2. The method of claim 1 wherein the method can use free running clocks, without the need to alter the clock of the first system, or the clock of the second system to bring them in synchronization.

3. The method of claim 1 wherein the correction factor is accurate within microseconds.

4. The method of claim 1 wherein the duplets are encrypted between the point of generation and the point of processing.

5. The method of claim 1 computing the correction factor in less than ten seconds, or within ten cycles, wherein a cycle is the time interval necessary to determine a correction factor, or the relative timing relationship between systems.

6. The method of claim 1 wherein the departure packet identities or arrival packet identities are one of an embedded source address, an embedded destination address, a sequence number, a temporal sequence, a hash, a checksum, a cyclic redundancy check, encrypted data, compressed data, or any combination thereof.

7. The method of claim 1, further comprising the step of transferring the correction factor from the processing system to the first system and/or the second system.

8. The method of claim 1, wherein the timing relationship is of one or more of clock phase or clock frequency.

9. The method of claim 1 further comprising the step of computing an enhanced correction factor by subtracting from the difference between the arrival and departure timestamps a propagation time between the first system and the second system.

10. The method of claim 1 wherein the method maintains a correction factor for each free running oscillator.

11. The method of claim 1 further comprising the steps of:
    a) timestamping another event occurring at any of the first or the second system with the local timing; and
    b) retiming the timestamp with the correction factor.

12. The method of claim 1, wherein the metadata packets are transmitted in the normal course of operating the first system, and are not generated upon request.

13. The method of claim 1, wherein the communication channel is a path through a network.

14. The method of claim 1, wherein the method does not alter the data packets which are timestamped.

15. The method of claim 1, wherein the metadata packets comprise a percentage of timestamps generated by the data packets transferred from the first system to the second system.

16. The method of claim 1 further synchronizing daisy chained systems, comprising the steps:
    a) calculating a first correction factors, CF1 synchronizing a second system to a first system;
    b) calculating a second correction factor, CF2 synchronizing a third system to the second system; and
    c) calculating a third correction factor, CF3 synchronizing the third system to the first system by combining the first correction factor, CF1 with the second correction factor, CF2.

17. The method of claim 1 wherein the method does not alter the clock of the systems and uses the pattern of correction factors variation in time to identify or authenticate.

18. The method of claim 1, wherein the first system, or the second system, or both are part of an exchange systems.

19. Non-transitory computer readable computer-readable instructions, which when executed by one or more processors, cause the method of claim 1 to be performed.

20. A system for synchronization of computers comprising
    a) receiving, by a processor, a first duplet comprising a departure timestamp and a departure packet identity generated by a first system when a data packet transmission event occurs at the first system;
    b) receiving, by the processor, a second duplet comprising an arrival timestamp and an arrival packet identity when a data packet reception event occurs at a second system;
    c) receiving, by the processor, a third duplet comprising a departure timestamp and a departure packet identity when a data packet transmission event occurs at the second system;
    d) receiving, by the processor, a fourth duplet comprising an arrival timestamp and an arrival packet identity when a data packet reception event occurs at the first system;
    e) matching, by the processor, departure packets identities with arrival packets identities within the first and second duplets;
    f) matching, by the processor, departure packets identities with arrival packets identities within the third and fourth duplets;
    g) pairing, by the processor, for each matched departure and arrival packet identities, the departure timestamp with the arrival timestamp generated by the same data packet; and
    h) computing, by the processor, a correction factor using paired departure timestamp and arrival timestamp; and
    i) synchronizing, by the processor and using the correction factor, the times of the first and second systems.

* * * * *